US012377672B2

(12) United States Patent
Harigae et al.

(10) Patent No.: US 12,377,672 B2
(45) Date of Patent: Aug. 5, 2025

(54) PRINTING APPARATUS AND ROLL HOLDING DEVICE

(71) Applicant: CANON KABUSHIKI KAISHA, Tokyo (JP)

(72) Inventors: Ryo Harigae, Tokyo (JP); Itaru Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 18/178,219

(22) Filed: Mar. 3, 2023

(65) Prior Publication Data

US 2023/0294428 A1 Sep. 21, 2023

(30) Foreign Application Priority Data

Mar. 18, 2022 (JP) ................................ 2022-043643

(51) Int. Cl.
*B41J 13/10* (2006.01)

(52) U.S. Cl.
CPC .................................. *B41J 13/103* (2013.01)

(58) Field of Classification Search
CPC . B41J 13/103; B41J 11/70; B41J 15/08; B41J 15/02; B65H 16/06; B65H 2301/41346; B65H 2801/12
See application file for complete search history.

(56) References Cited

U.S. PATENT DOCUMENTS 6,361,229 B1 3/2002 Shinga ................... B65H 16/06
6,561,453 B1 5/2003 Shinga ................... B65H 16/06
9,004,390 B2 4/2015 Morinaga .............. B65H 75/00
9,156,252 B2 10/2015 Harigae ..................... B41J 2/01
9,434,189 B2 9/2016 Anayama et al. ......... B62B 3/04
9,580,268 B2 2/2017 Nagashima et al. ... B65H 31/00
9,592,683 B2 3/2017 Kobayashi et al. ... B65H 23/08
(Continued)

FOREIGN PATENT DOCUMENTS

| | | |
|---|---|---|
| JP | H09-240094 | 9/1997 |
| JP | 2003-266845 | 9/2003 |

(Continued)

OTHER PUBLICATIONS

U.S. Appl. No. 18/154,740, filed Jan. 13, 2023.
(Continued)

*Primary Examiner* — Douglas X Rodriguez
*Assistant Examiner* — Tracey M McMillion
(74) *Attorney, Agent, or Firm* — Venable LLP

(57) ABSTRACT

Provided is a printing apparatus performing printing on a sheet drawn out from a roll, comprising: a roll holding unit; a support unit rotatably supporting the roll holding unit; a core portion provided to the roll holding unit and inserted into a hollow portion of the core pipe from an end portion of the core pipe to extend along an axis of the core pipe; a first contact member provided to the core portion and elastically deformed to a position where the first contact member presses a first portion of an inner wall surrounding the hollow portion of the core pipe; and a second contact member provided to the core portion at a position that is different from the position where the first contact member is provided and elastically deformed to a position where the second contact member presses a second portion of the inner wall.

13 Claims, 20 Drawing Sheets

(56) References Cited

U.S. PATENT DOCUMENTS

| | | | | |
|---|---|---|---|---|
| 9,969,192 | B2 | 5/2018 | Suzuki et al. | B41J 15/16 |
| 10,183,509 | B2 | 1/2019 | Kobayashi et al. | B65H 23/16 |
| 10,232,644 | B2 | 3/2019 | Wada et al. | B41J 11/00 |
| 10,315,445 | B2 | 6/2019 | Suzuki et al. | B41J 15/16 |
| 10,457,516 | B2 | 10/2019 | Ohashi et al. | B65H 31/26 |
| 10,754,286 | B2 | 8/2020 | Sugiyama et al. | B41J 11/00 |
| 10,906,764 | B2 | 2/2021 | Yoneyama et al. | B65H 23/26 |
| 11,003,123 | B2 | 5/2021 | Sugiyama et al. | B41J 11/00 |
| 11,122,175 | B2 | 9/2021 | Ohashi et al. | H04N 1/00 |
| 11,130,648 | B2 | 9/2021 | Asai et al. | B65H 23/04 |
| 11,541,674 | B2 | 1/2023 | Wada et al. | B41J 11/00 |
| 11,560,000 | B2 | 1/2023 | Suto et al. | B41J 29/38 |
| 11,590,777 | B2 | 2/2023 | Suzuki et al. | B41J 11/00 |
| 11,667,138 | B2 | 6/2023 | Kuronuma et al. | B41J 13/00 |
| 2009/0194631 | A1 | 8/2009 | Genta | B65H 75/24 |
| 2009/0242603 | A1 | 10/2009 | Kobayashi et al. | B65H 20/02 |
| 2011/0076083 | A1 * | 3/2011 | Tsurui | B65H 19/126 226/152 |
| 2021/0197592 | A1 | 7/2021 | Yoneyama et al. | B41J 11/70 |
| 2021/0197593 | A1 | 7/2021 | Asai et al. | B41J 11/70 |
| 2021/0197594 | A1 | 7/2021 | Abe et al. | B41J 13/00 |
| 2021/0276350 | A1 | 9/2021 | Murata et al. | B41J 13/00 |
| 2021/0284475 | A1 | 9/2021 | Shimamura et al. | B65H 23/16 |
| 2021/0284476 | A1 | 9/2021 | Harigae et al. | B65H 23/16 |
| 2021/0403268 | A1 | 12/2021 | Asai et al. | B65H 23/04 |
| 2022/0105738 | A1 | 4/2022 | Murata et al. | B41J 15/04 |
| 2022/0388318 | A1 | 12/2022 | Wada et al. | B41J 11/00 |
| 2023/0116020 | A1 | 4/2023 | Suto et al. | B41J 13/00 |

FOREIGN PATENT DOCUMENTS

| | | | |
|---|---|---|---|
| JP | 2004-358764 | | 12/2004 |
| JP | 2004358764 | A * | 12/2004 |
| JP | 5553570 | B2 | 7/2014 |

OTHER PUBLICATIONS

U.S. Appl. No. 18/101,411, filed Jan. 25, 2023.
U.S. Appl. No. 18/106,647, filed Feb. 7, 2023.
U.S. Appl. No. 18/178,210, filed Mar. 3, 2023.
Office Action dated Nov. 6, 2024 in U.S. Appl. No. 18/178,210.
Notice of Allowance dated May 15, 2025 in U.S. Appl. No. 18/178,210.

* cited by examiner

PRINTING APPARATUS AND ROLL HOLDING DEVICE

BACKGROUND OF THE INVENTION

Field of the Invention

The present disclosure relates to a printing apparatus and a roll holding device and, to be specific, relates to a structure of a roll holding device configured to hold a printing medium in the shape of a roll.

Description of the Related Art

As this type of a roll holding device, Japanese Patent No. 5553570 (hereinafter, referred to as PTL 1) describes a device that holds roll paper at two ends of a core pipe around which the roll paper is rolled up by fitting portions protruding from flanges to a hollow portion of the core pipe. According to this holding device, even in a case where the roll paper width is great, a wide working space is unnecessary for mounting of the roll paper, and it is possible to improve the workability. Additionally, since the holding device can be formed of the flanges and the fitting portions protruding therefrom, it is possible to relatively save the weight of the holding device.

In such a holding device described in PTL 1, a leaf spring is provided to each of the above-described fitting portions inserted into the roll paper core pipe, and the roll paper is held by the elastic force of this leaf spring. For this reason, the elastic force of the leaf spring may be a relatively great resistance to the insertion at the time of inserting the fitting portion of the flange into the roll paper core pipe. Particularly, the inner diameter of the core pipe may be relatively small due to the size variation of the roll paper depending on the roll paper to be used, and accordingly the insertion resistance is increased.

SUMMARY OF THE INVENTION

An aspect of the present disclosure is a printing apparatus that performs printing on a sheet drawn out from a roll in which the sheet is rolled up around a core pipe, comprising: a roll holding unit configured to hold the roll; a support unit configured to be able to rotatably supports the roll holding unit; a core portion provided to the roll holding unit and configured to be inserted into a hollow portion of the core pipe from an end portion of the core pipe so as to extend along an axis of the core pipe; a first contact member provided to the core portion and configured to be elastically deformed to a position where the first contact member presses a first portion of an inner wall surrounding the hollow portion of the core pipe; and a second contact member provided to the core portion at a position that is different from the position where the first contact member is provided and configured to be elastically deformed to a position where the second contact member presses a second portion of the inner wall surrounding the hollow portion of the core pipe.

Further features of the present invention will become apparent from the following description of exemplary embodiments with reference to the attached drawings.

DESCRIPTION OF THE EMBODIMENTS

Figure 1:
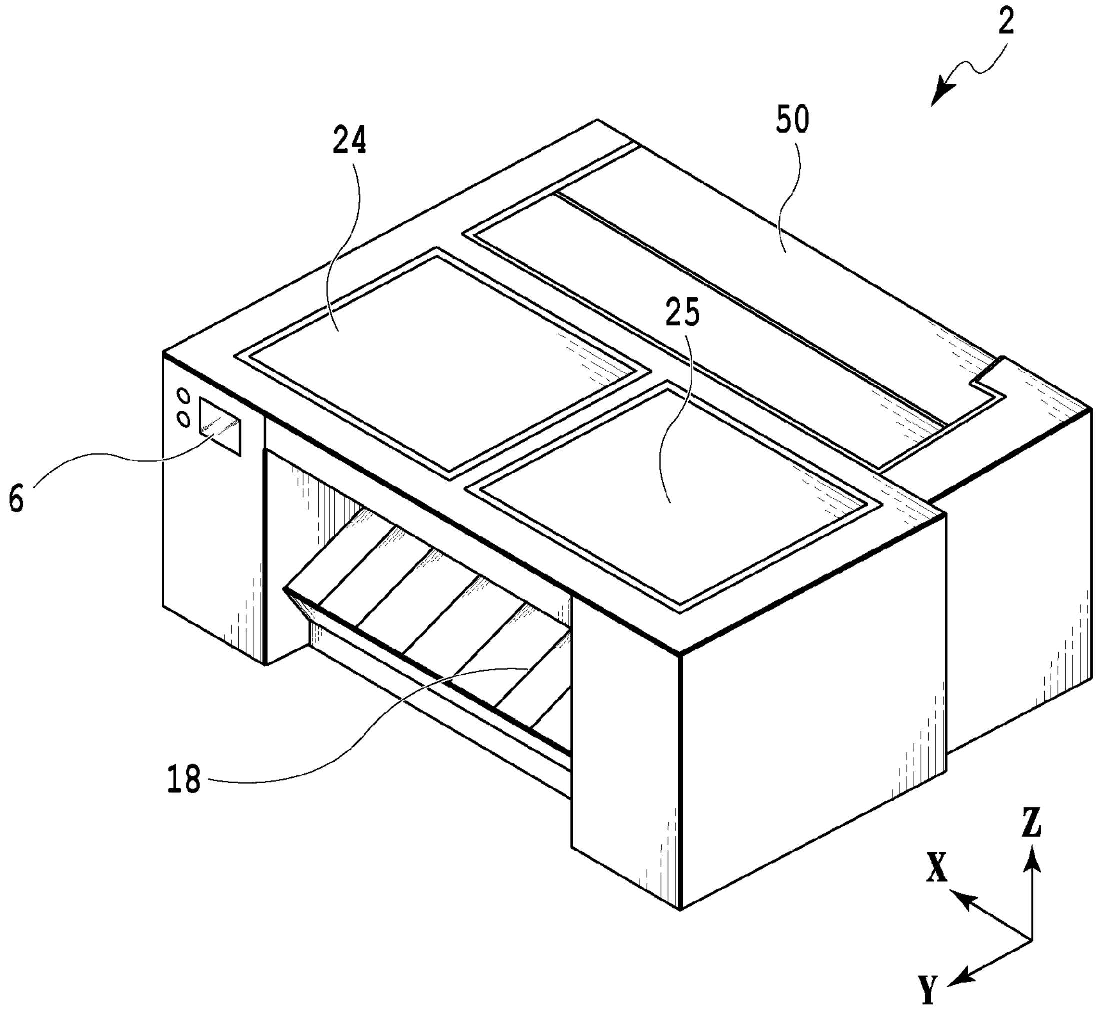
FIG. 1 is an external perspective view schematically illustrating a printing apparatus according to one embodiment of the present disclosure.

Embodiments of the present disclosure are described below in details with reference to the drawings. Note that, the same reference numerals between the drawings indicate the same or corresponding elements.

Embodiment 1

FIG. 1 is an external perspective view schematically illustrating a printing apparatus according to one embodiment of the present disclosure. A printing apparatus 2 has a form in which the elements of the printing apparatus 2 are covered with an exterior case and a cover. An operation panel 6 is provided to the exterior case on the device front surface side (a Y direction in FIG. 1), and a user can perform various settings, input commands, and confirm information on the printing apparatus 2 through this panel, for example. A roll paper cover 50 is provided at the rear of the device so as to be opened and closed by using a shaft at a device rear end as a pivot shaft. The user can mount and unmount a roll paper unit 201, that is a roll-shaped printing medium, on and from a roll paper setting unit of the printing apparatus 2 while the cover 50 is opened. Additionally, it is possible to prevent the roll paper unit 201 from being covered with dust and trash by closing the cover 50. As described later in details in FIG. 8, the printing apparatus 2 of the present embodiment can use roll paper portions with multiple roll paper widths, and the roll paper setting unit has corresponding mounting configurations. Two upper covers 24 and 25 that are opened and closed with a pivot shaft on the rear side are provided at the front of the device. It is possible to perform an operation to set the roll paper to a conveyance path, device maintenance for solving paper jam and the like, an attachment and detachment operation for ink tank replacement, and the like while the upper covers 24 and 25 are opened.

Figure 2:
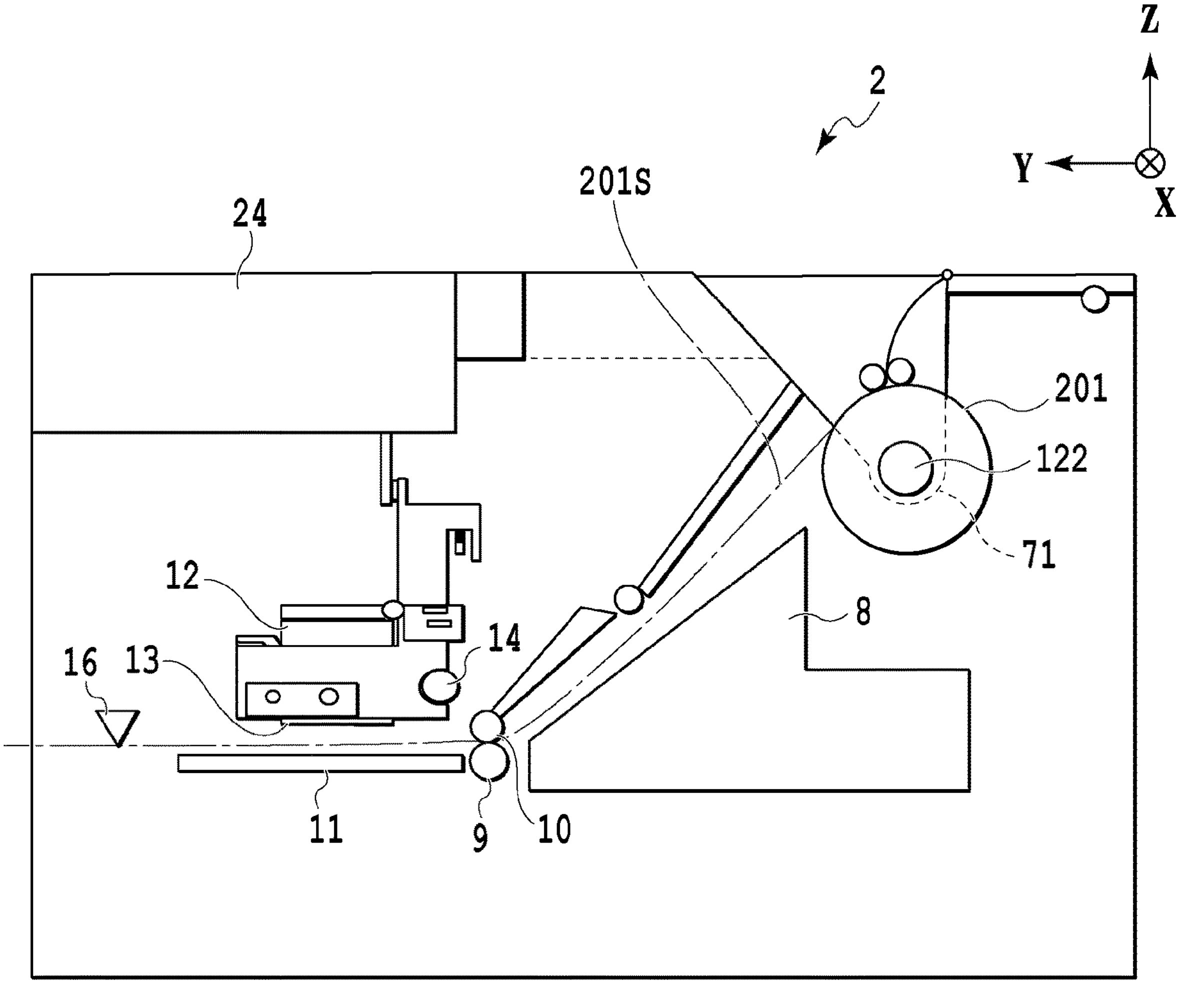
FIG. 2 is a schematic cross-sectional view of the printing apparatus illustrated in FIG. 1 viewed along an X direction in FIG. 2.

FIG. 2 is a schematic cross-sectional view of the printing apparatus illustrated in FIG. 1 viewed from an X direction in FIG. 2.

The printing apparatus 2 of the present embodiment can use roll paper 201S using the roll paper unit 201 and cut paper (not illustrated) as a printing medium (a sheet). The roll paper unit 201 is formed by rolling up the roll paper 201S around a hollow core pipe and attaching thereto flanges for holding the roll, which are described later in FIG. 5 and followings, on two sides of the core pipe. In a case where the roll paper 201S is used as the printing medium, the roll paper unit 201 is held by the device main body side by means of a conveyance-reference side flange sliding shaft portion 122 and a non-conveyance-reference side flange sliding shaft portion 126 (see FIGS. 5A and 5B) of the unit 201. Specifically, the roll paper unit 201 is rotatably held by a conveyance-reference side flange bearing 71 and a non-conveyance-reference side flange bearing 73 (see FIGS. 7A and 7B) of the device main body. The roll paper 201S drawn by the user from the roll paper unit 201 held by the bearings 71 and 73 is conveyed to the downstream side through a sheet conveyance path along a lower guide 8. Once a leading end of the roll paper 201S reaches a nip portion between a conveyance roller 9 and a driven roller 10, the conveyance roller 9 is driven by a conveyance motor 51 (see FIG. 3) to rotate, and accordingly the roll paper 201S is nipped by the conveyance roller 9 and the driven roller 10. Additionally, the roll paper 201S is conveyed onto a platen 11 facing a printing head 13 by driving the conveyance roller 9 to rotate in the same state. On the other hand, in a case where the cut paper is used, a folded tray (not illustrated) is unfolded and arrayed on the lower guide 8 while the roll paper unit 201 is detached from the device 2. The cut sheet is disposed on the tray in this state such that a leading end reaches the nip portion between the conveyance roller 9 and the driven roller 10.

The platen 11 forms an additional conveyance path for the conveyed roll paper 201S (or the cut paper; the same applies to the description of FIG. 2 below). Also, the platen 11 supports the roll paper from the back side and maintains a constant distance between the printing head 13 and the roll paper 201S. The printing head 13 is built in a carriage 12, and the carriage 12 is guided and supported by a carriage shaft 14 as a scanning guide extending in the X direction to move reciprocally in ±X directions (main scanning directions) along the scanning guide. The printing head 13 includes ejection port arrays in which multiple ejection ports (nozzles) ejecting inks of yellow (Y), cyan (C), magenta (M), and black (Bk) are arrayed in the Y direction, for example. The inks are ejected from those ejection ports of the ejection port arrays in a downward direction (a −Z direction) in accordance with image data while the carriage 12 is moving. Once an image of one line is printed by the ejection operation of the printing head 13 and the movement of the carriage 12 as described above, the roll paper 201S is conveyed by a predetermined amount in the conveyance direction Y by the conveyance roller 9 and the driven roller 10, and the carriage 12 is moved again to print the next line. An image is printed on the entirety of a predetermined page by repeating those operations. Ink tanks respectively corresponding to the inks Y, M, C, and Bk ejected from the printing head 13 are provided to a right end (an end portion in the −X direction in FIG. 1) of the device 2 in the movement direction of the carriage 12. The printing head 13 is supplied with the inks from those ink tanks through corresponding tubes. A cutter 16 is provided to the roll paper conveyance path at a predetermined distance on the downstream side of the printing head 13 and can cut the roll paper 5201 into a predetermined length. Note that, the printing operation in a case of using the cut paper as the printing medium is similar to that in the case of using the roll paper 201S. The cut roll paper 201S after printing ends is conveyed to a paper discharging tray 18 (see FIG. 1).

Figure 3:
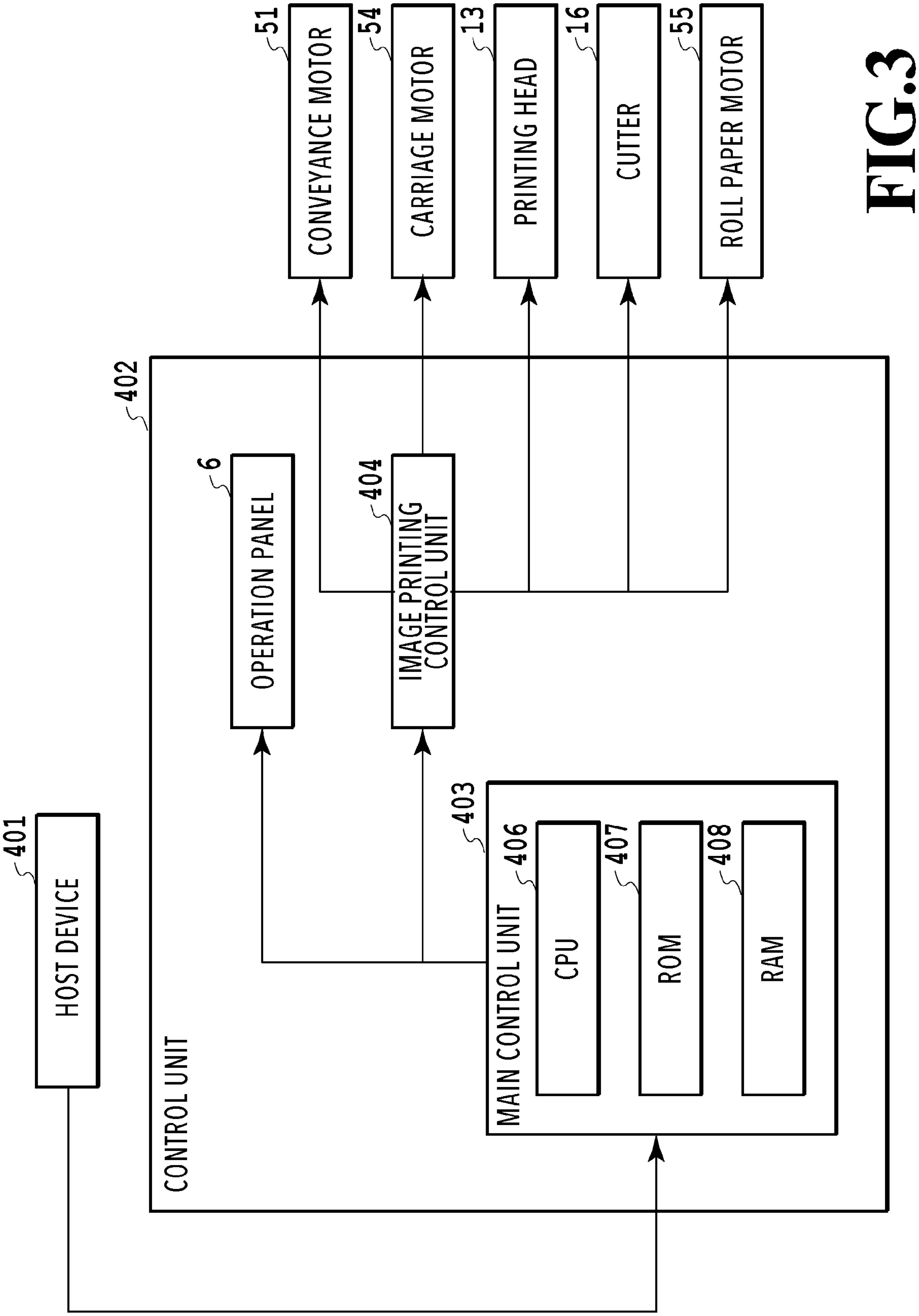
FIG. 3 is a block diagram illustrating a control configuration of the printing apparatus illustrated in FIGS. 1 and 2.

FIG. 3 is a block diagram illustrating a control configuration of the printing apparatus illustrated in FIGS. 1 and 2.

The printing apparatus 2 of the present embodiment includes a control unit 402, and the control unit 402 controls the printing operation and the like based on a printing command transmitted from a host device 401. Specifically, the host device 401 transmits the printing command of an image generated by the host device 401 to a main control unit 403 of the printing apparatus 2. The control unit 402 includes the main control unit 403 and an image printing control unit 404 as a main configuration. The main control unit 403 includes a CPU 406, a ROM 407, and a RAM 408, and the CPU 406 controls overall the printing apparatus 2 according to various programs and parameters stored in the ROM 407 by using the RAM 408 as a working area. The image printing control unit 404 controls driving of the conveyance motor 51, a carriage motor 54, the printing head 13, an actuator of the cutter 16, a roll paper motor 55, and the like under instruction of the main control unit 403.

Note that, in addition to the above-described form, the form of the printing apparatus includes a printing unit in a copier or a facsimile, for example. Additionally, a multi-function peripheral to which other functions such as a printer function, a facsimile function, an original document reading function, and an imaging function are added and also a system device formed by connecting the printing apparatus to a host device such as a computer are included in the printing apparatus. It is obvious from the following descriptions that it is possible to apply the present disclosure to those devices, and in this regard, those devices are included in the printing apparatus.

[Mounting of Roll Paper Unit]

Figure 4:
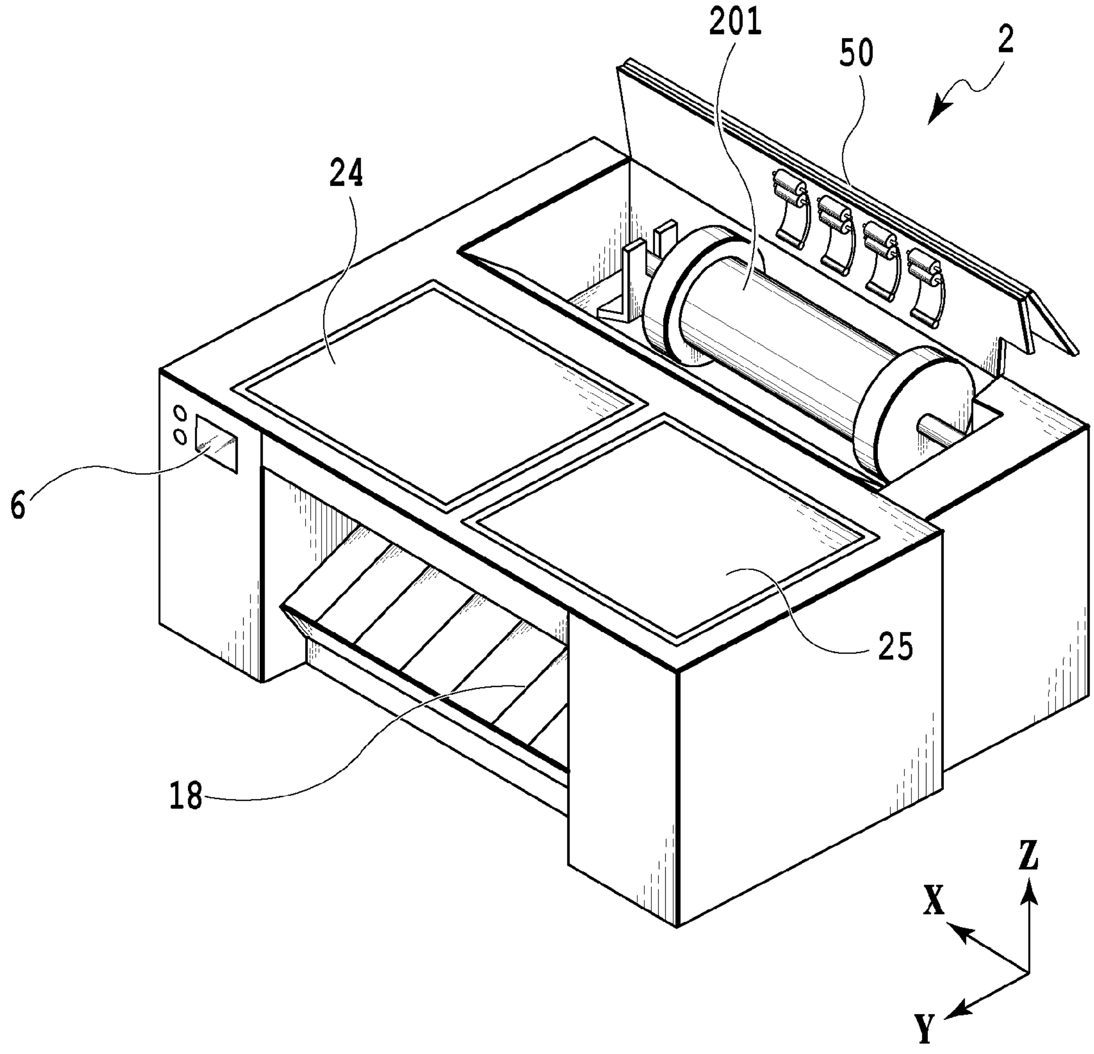
FIG. 4 is a perspective view describing mounting of a roll paper unit on the printing apparatus according to one embodiment of the present disclosure.
Figure 7A:
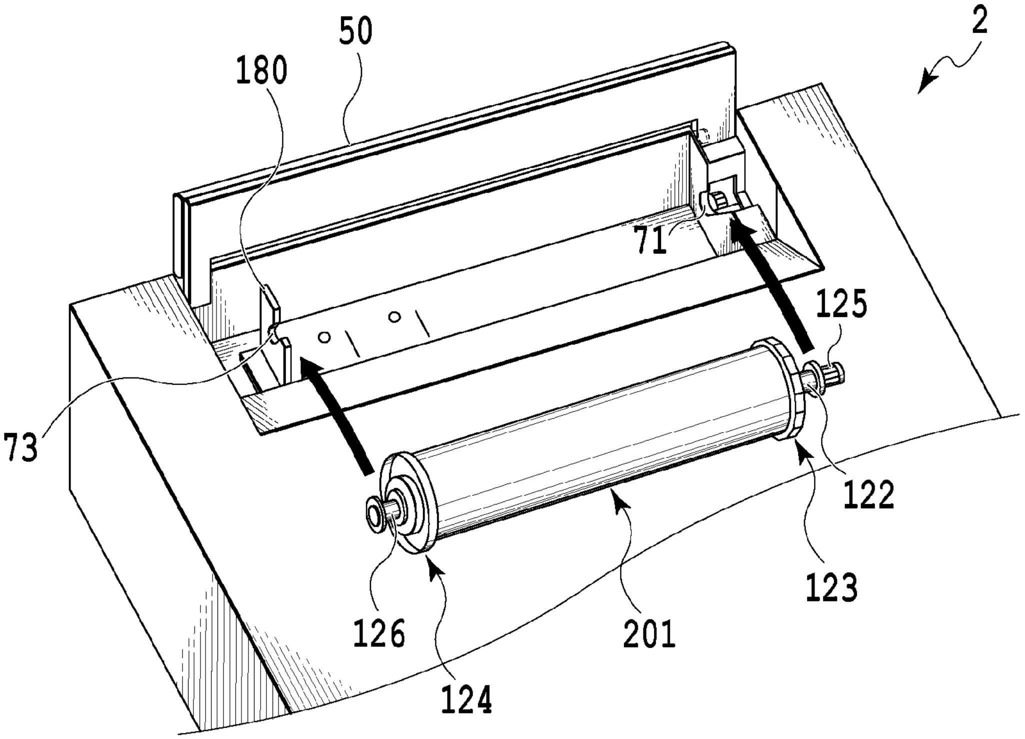
FIGS. 7A and 7B are diagrams describing mounting of the roll paper unit on the printing apparatus according to one embodiment of the present disclosure.
Figure 7B:
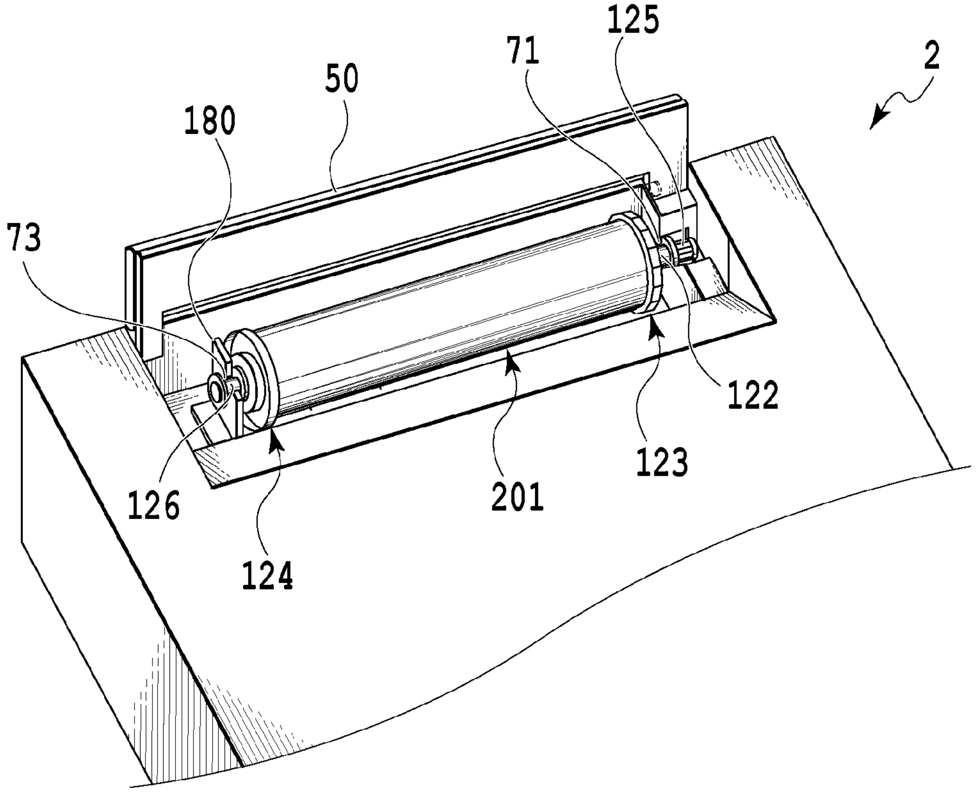

FIG. 4 is a perspective view describing mounting of the roll paper unit 201 on the printing apparatus 2 according to one embodiment of the present disclosure. At the time of mounting the roll paper unit 201, flange units (described later) are attached to two ends of a core pipe 202 around which the roll paper 201S is rolled up. This core pipe 202 may be made of paper such as cardboard. The roll paper unit 201 to which the flange units are attached as described above can be inserted and mounted on a roll paper setting unit while the roll paper cover 50 of the printing apparatus 2 is opened by the user. As illustrated in FIGS. 7A and 7B, the sliding shaft portions 122 and 126 of the flange units that function as a roll holding member (a roll holding device) in this process are supported by the conveyance-reference side flange bearing 71 and the non-conveyance-reference side flange bearing 73 of the roll paper setting unit. Here, the conveyance-reference side flange bearing 71 and the non-conveyance-reference side flange bearing 73 function as a support unit.

[Attaching of Flange Units to Roll Paper Portion]

Figures 5A, 5B:
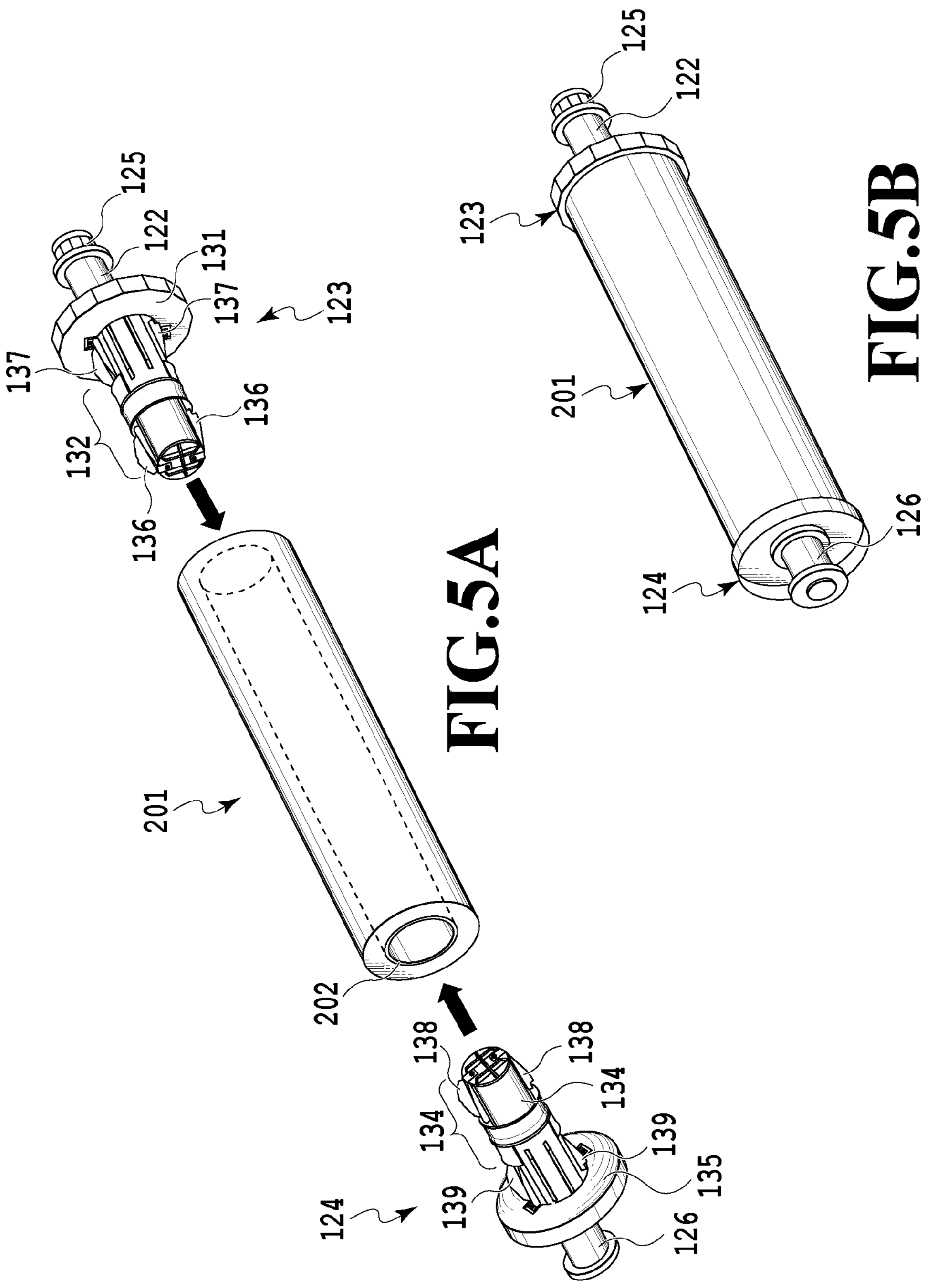
FIGS. 5A and 5B are perspective views describing attaching of flange units to roll paper rolled up around a core pipe according to one embodiment of the present disclosure.

FIGS. 5A and 5B are perspective views describing attaching of the flange units into the roll paper 201S rolled up around the core pipe 202.

The flange units function as a roll holding unit (a roll holding device) and include a conveyance-reference side flange unit 123 and a non-conveyance-reference side flange unit 124. The flange units 123 and 124 are respectively inserted and attached to the corresponding two ends of the hollow portion of the roll paper core pipe 202. To be specific, as illustrated in FIG. 5A, the conveyance-reference side flange unit 123 includes a conveyance-reference side flange 131 and a conveyance-reference side flange core portion 132 protruding from one surface of the conveyance-reference side flange 131. Additionally, the conveyance-reference side flange unit 123 includes the conveyance-reference side flange sliding shaft portion 122 protruding from a surface of the conveyance-reference side flange 131 on the opposite side of the above-described one surface and a flange gear 125 continuous from the conveyance-reference side flange sliding shaft portion 122. Here, the surface of the conveyance-reference side flange 131 on the conveyance-reference side flange core portion 132 side is a flat surface, and with this surface, the conveyance-reference side flange 131 can be abutted (particularly, closely abutted) onto an end portion of the roll paper core pipe 202 and an end surface of the roll paper 201S rolled up around the roll paper core pipe 202. The conveyance-reference side flange core portion 132 includes first fitting members 136 and second fitting members 137 disposed at a predetermined distance from each other in a longitudinal direction thereof. As described later in details in FIG. 12 and the like, those first fitting member 136 and second fitting member 137 can suppress tilting of the flange unit attached to the roll paper unit 201 due to the weight of the roll paper 201S.

As with the conveyance-reference side flange unit 123, the non-conveyance-reference side flange unit 124 includes a non-conveyance-reference side flange 135 and a non-conveyance-reference side flange core portion 134 protruding from one surface of the non-conveyance-reference side flange 135. Additionally, the non-conveyance-reference side flange unit 124 includes a non-conveyance-reference side flange sliding shaft portion 126 protruding from the other surface of the non-conveyance-reference side flange 135. Here, the surface of the non-conveyance-reference side flange 135 on the non-conveyance-reference side flange core portion 134 side is a convexly curved surface. For this reason, the surface can be abutted onto the roll paper core pipe 202 and the end surface of the roll paper 201S rolled up around the roll paper core pipe 202 and can bias the roll paper unit 201 to the conveyance-reference side. As with the conveyance-reference side, the non-conveyance-reference side flange core portion 134 includes first fitting members 138 and second fitting members 139 disposed at a predetermined distance from each other. As described later in details, those first fitting members 138 and second fitting members 139 suppress tilting of the flange unit due to the weight of the roll paper 201S.

In the above-described configuration, the pair of the fitting member 136 on the conveyance-reference side are disposed at intervals of 180 degrees along a circumference of the flange core portion 132. The pair of the fitting member 137 on the conveyance-reference side are also disposed at intervals of 180 degrees along a circumference of the flange core portion 132. Similarly, the pair of the fitting member 138 on the non-conveyance-reference side are disposed at intervals of 180 degrees along a circumference of the flange core portion 134. The pair of the fitting member 139 on the non-conveyance-reference side are also disposed at intervals of 180 degrees along a circumference of the flange core portion 134. One of the pair of fitting members 136 and one of the pair of the fitting member 137 are disposed at the same positions along circumferences of the flange core portion 132. This also applies to the other of the pair of fitting member 136 and the other of the pair of the fitting member 137. Similarly, one of the pair of fitting members 138 and one of the pair of the fitting member 139 are disposed at the same positions along circumferences of the flange core portion 134. This also applies to the other of the pair of fitting member 138 and the other of the pair of the fitting member 139. As a result, each of flange core portions 132, 134 includes the four fitting members. Note that, the number of the fitting members is not limited thereto and can be determined in accordance with specifications of the device and the like. Likewise, it is not limited to the mode that the number of the fitting members 137, 139 respectively close to the flange 131, 135 and the number of the fitting members 136, 138 respectively far from the flange 131, 135 in their respective flange core portion are equal to each other.

Figure 6A:
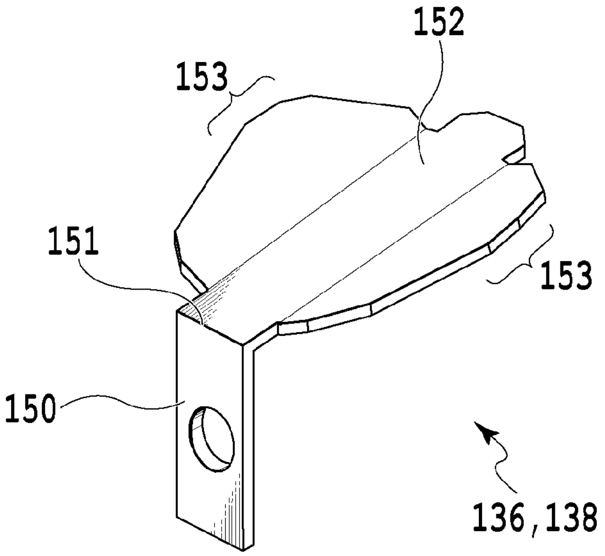
FIGS. 6A and 6B are perspective views illustrating fitting members according to the embodiment of the present disclosure.
Figure 6B:
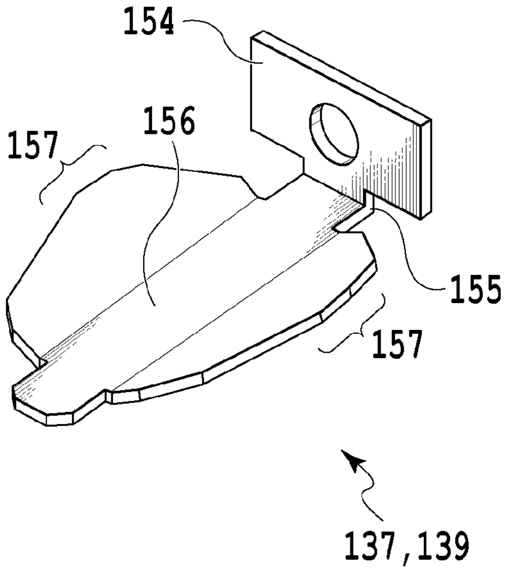

FIGS. 6A and 6B are perspective views illustrating the fitting members according to the embodiment of the present disclosure. FIG. 6A illustrates the first fitting member 136, 138 and FIG. 6B illustrates the second fitting member 137, 139. The fitting member 136, 138 includes a flat surface portion 152 and a pair of interference portions 153 which form a pair of wings. A metallic plate member is bended along a boundary between the flat surface portion 152 and one of the pair of interference portion 153 and along another boundary between the flat surface portion 152 and the other of the pair of interference portion 153. Similarly, the fitting member 137, 139 includes a flat surface portion 156 and a pair of interference portions 157 which form a pair of wings. A metallic plate member is bended along a boundary between the flat surface portion 156 and one of the pair of interference portion 157 and along another boundary between the flat surface portion 156 and the other of the pair of interference portion 157. With this bending, the fitting member 136, 138 has the elasticity against the opposite forces acting on the flat surface portion 152 and the pair of interference portions 153. This also applies to the fitting member 137, 139. The fitting members 136, 138 are respectively bent from the flat surface portions 152 at constricted portions 151, and the bent portion functions as a fixing portion 150 screwed on the flange unit. The fitting members 137, 139 are respectively bent from the flat surface portions 156 at constricted portions 155, and the bent portion functions as a fixing portion 154 screwed on the flange unit.

Figure 14:
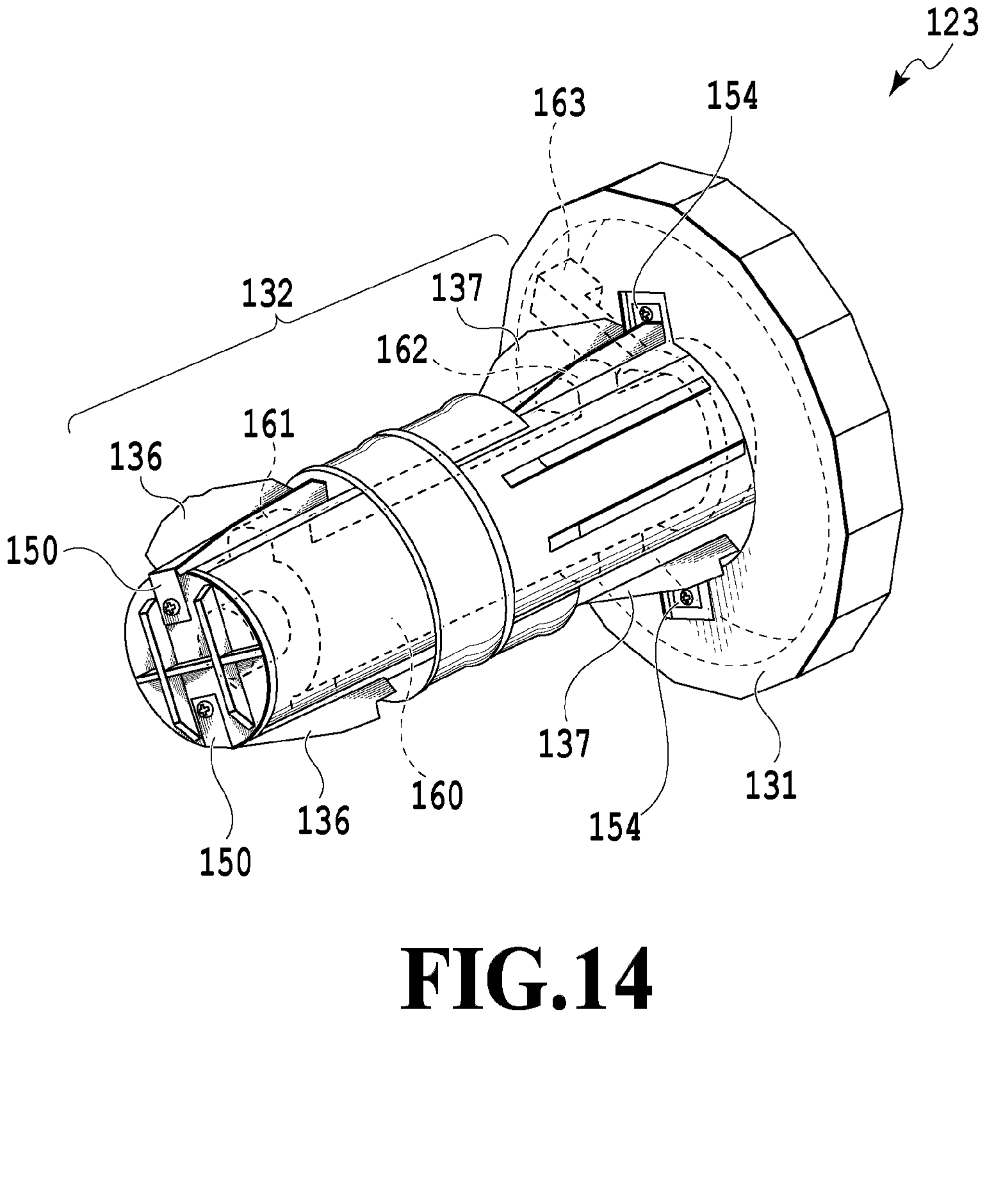
FIG. 14 is a perspective view illustrating a flange unit according to another embodiment of the present disclosure.

As illustrated in details in FIG. 14, the fixing portion 154 of the fitting member 137 is screwed on the flange 131. Likewise, as illustrated in detail in FIG. 14, the above-described fixing portion 150 of the fitting member 136 is screwed on an end surface of the flange core portion 132. Similarly, although no figure shows, the fixing portion 154 of the fitting member 139 is screwed on the flange 135. Likewise, the above-described fixing portion 150 of the fitting member 138 is screwed on an end surface of the flange core portion 134. In the present embodiment, with respect to each of fitting members 136, 137, 138, 139, the fixing portion 150 or 154 is fixed by a screw as described above, and the flat surface portion 152 or 156 is in contact with an outer surface of the corresponding flange core portion 132. Note that, an opening may be provided in a region of the flange core portion 132 corresponding to portions other than the fixing portion 150 or 154 of the fitting member, and the fitting member is deformed so as to enter the inside of a hollow portion of the flange core portion through this opening. In this case, it is favorable that the elastic force of the fitting member is relatively great enough so that the core pipe 202 of the roll paper unit 201 can be appropriately pressed and held by the elastic force.

In order to attach the conveyance-reference side flange unit 123 and the non-conveyance-reference side flange unit 124 to the roll paper portion, first, each of the conveyance-reference side flange core portion 132 and the non-conveyance-reference side flange core portion 134 is inserted into the hollow portion of the core pipe 202 of the roll paper portion. The outer diameters of both of the conveyance-reference side flange core portion 132 and the non-conveyance-reference side flange core portion 134 except for the portions of the fitting members 136 and 138 are designed smaller than the inner diameter of the hollow portion of the core pipe 202 of the roll paper portion. On the other hand, each of the first fitting members 136, the second fitting members 137, the first fitting members 138, and the second fitting members 139 has the shape of a leaf spring that will be elastically deformed as described above in FIG. 6. Thus, those fitting members 136-139 can have a dimension relationship for being fitted with the hollow portion of the roll paper core pipe 202, in other words, a dimension relationship for being in contact with the roll paper core pipe 202 with force acting on each other.

FIG. 5B illustrates a state where the conveyance-reference side flange unit 123 and the non-conveyance-reference side flange unit 124 are attached to the roll paper portion including the core pipe 202 and the roll paper rolled up around the core pipe 202. Hereinafter, a unit in this attached state is also referred to as a "roll unit".

[Mounting of Roll Paper Unit on Device Main Body]

FIGS. 7A and 7B are diagrams describing mounting of the roll paper unit on the printing apparatus 2. FIG. 7A illustrates a state before the roll paper unit, in other words, the roll paper portion to which the conveyance-reference side flange unit 123 and the non-conveyance-reference side flange unit 124 are attached, is mounted on the printing apparatus 2, and FIG. 7B illustrates a state where the roll paper unit is mounted on the printing apparatus 2.

As illustrated in FIG. 7A, the conveyance-reference side flange sliding shaft portion 122 is set to the conveyance-reference side flange bearing 71, and the non-conveyance-reference side flange sliding shaft portion 126 is set to the non-conveyance-reference side flange bearing 73. In a case where the user performs this mounting, it is possible to make positioning so as to fit the conveyance-reference side flange sliding shaft portion 122 to the conveyance-reference side flange bearing 71 and the non-conveyance-reference side flange sliding shaft portion 126 to the non-conveyance-reference side flange bearing 73, respectively. Particularly, even in a case where the conveyance-reference side flange sliding shaft portion 122 is close to the conveyance-reference side flange bearing 71 and the non-conveyance-reference side flange sliding shaft portion 126 is close to the non-conveyance-reference side flange bearing 73, respectively, the operation can be performed while the user can see the respective fitting positions. Thus, it is possible to facilitate positioning at the time of mounting the roll paper unit 201 on the printing apparatus 2. As also illustrated in FIG. 7B, even in a state after the mounting of the roll paper unit 201 on the printing apparatus 2 is completed, the conveyance-reference side flange sliding shaft portion 122 and the conveyance-reference side flange bearing 71 can be investigated visually. Also, the non-conveyance-reference side flange sliding shaft portion 126 and the non-conveyance-reference side flange bearing 73 can be investigated visually. Accordingly, it is obvious that those constituents can be investigated visually even in the middle of mounting.

[Position Setting of Bearing Member]

Figure 8A:
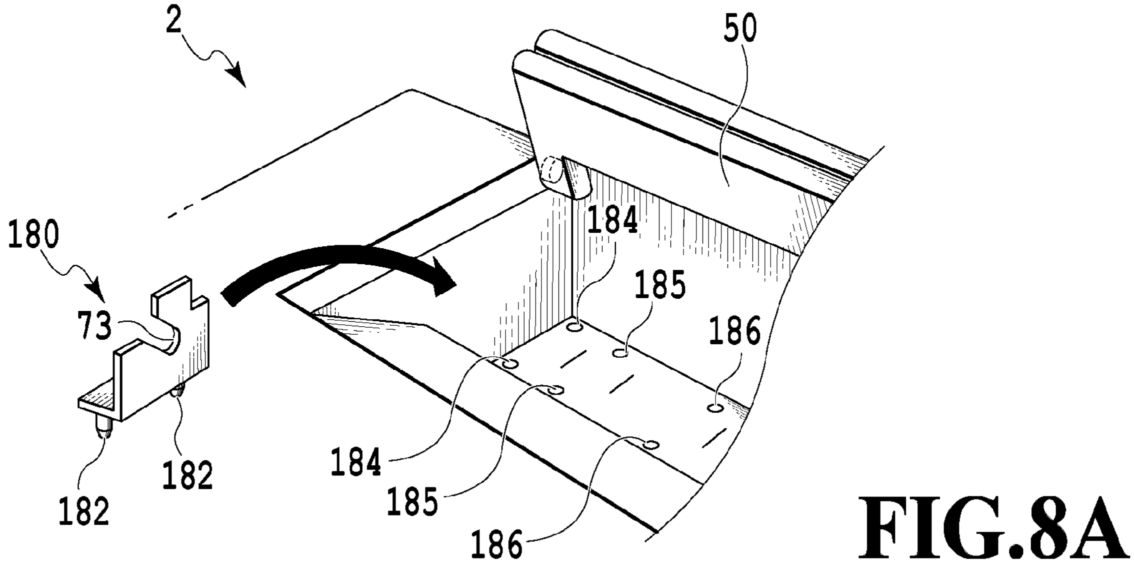
FIGS. 8A to 8C are perspective views describing position setting of a bearing member at the time of mounting the roll paper unit according to one embodiment of the present disclosure.
Figure 8B:
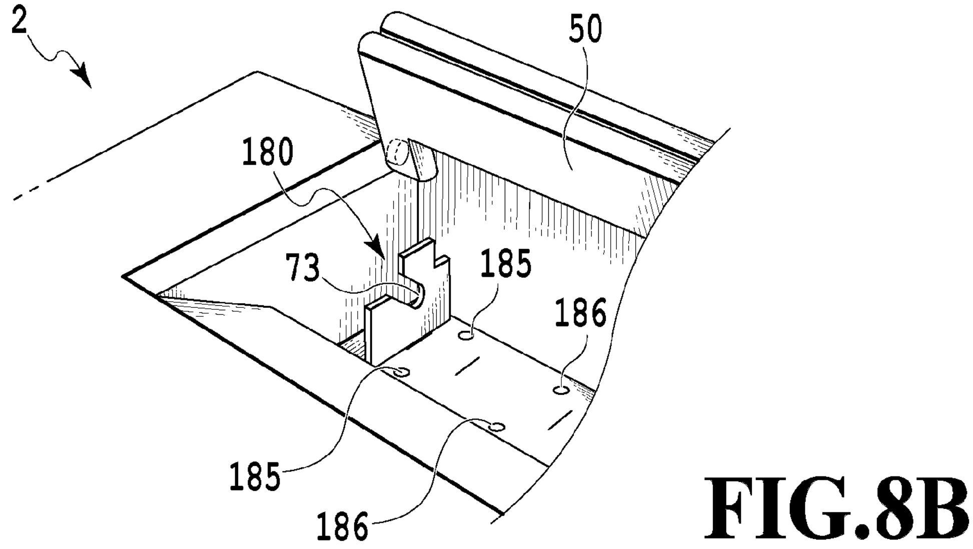
Figure 8C:
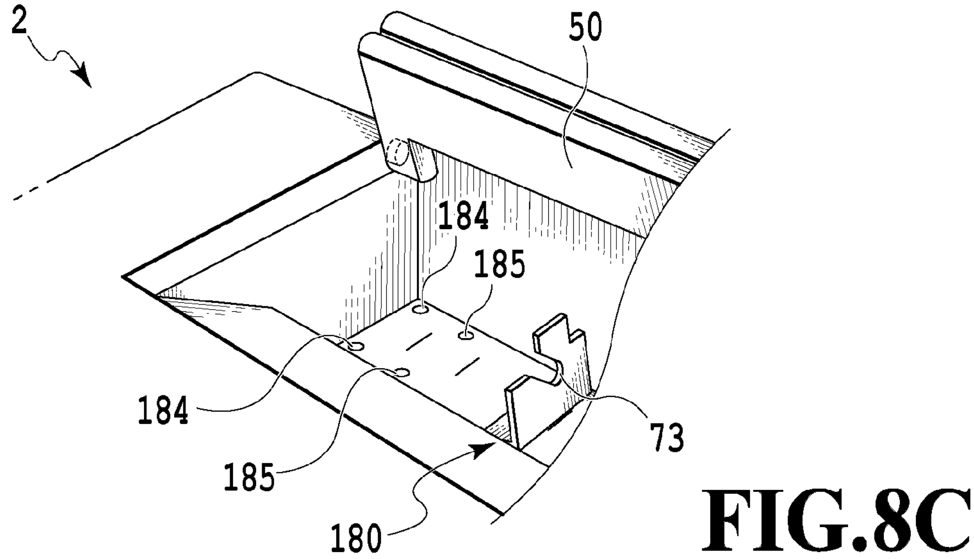

FIGS. 8A, 8B, and 8C are perspective views from obliquely above describing position setting of the bearing member in a case of mounting the roll paper unit and illustrate the roll paper setting unit of the printing apparatus 2 with the opened roll paper cover 50.

FIG. 8A illustrates a state where no bearing portion is set to a non-conveyance-reference side disposing portion of the roll paper unit 201 in the printing apparatus 2. FIG. 8B illustrates a state where a non-conveyance-reference side bearing member 180 for mounting the roll paper unit 201 with a wide roll paper width on the non-conveyance-reference side disposing portion is set (attached). FIG. 8C illustrates a state where the non-conveyance-reference side bearing member 180 for mounting the roll paper unit 201 with a narrow roll paper width on the non-conveyance-reference side disposing portion is set.

In FIG. 8A, at the time of mounting the roll paper unit 201 on the printing apparatus 2, a positioning projection 182 of the non-conveyance-reference side bearing member 180 is inserted into any one of positioning holes 184, 185, and 186 corresponding to the roll paper widths in the non-conveyance-reference side disposing portion. The positioning holes 184, 185, and 186 are set in accordance with the three sizes of the roll paper widths assumed to be used in the printing apparatus 2. Note that, the positioning holes provided at three portions are indicated in the example illustrated in FIG. 8A; however, as a matter of course, positioning holes may be provided at any number of positions corresponding to the number of sizes of the roll paper width assumed to be used. In the present embodiment, the positioning hole 184 corresponding to the maximum roll paper width of the roll paper unit 201, the positioning hole 185 corresponding to a smaller roll paper width than the above, and the positioning hole 186 corresponding to a further smaller roll paper width than the above are provided. FIG. 8B illustrates a state where the non-conveyance-reference side bearing member 180 is attached to the positioning hole 184 corresponding to the greatest roll paper width. FIG. 8C illustrates a state where the non-conveyance-reference side bearing member 180 is attached to the positioning hole 186 corresponding to the smallest roll paper width.

Figure 9:
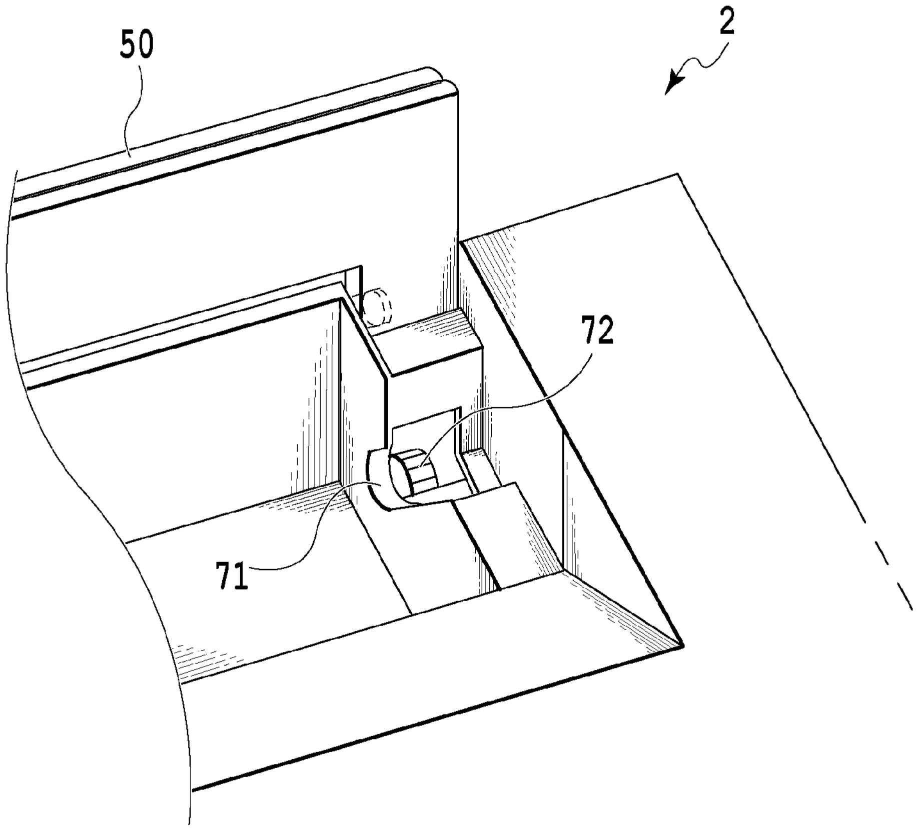
FIG. 9 is a perspective view describing mounting of the roll paper unit on a conveyance-reference side according to one embodiment of the present disclosure.

FIG. 9 is a perspective view from obliquely above describing mounting of the roll paper unit on the conveyance-reference side and illustrates the roll paper setting unit on the conveyance-reference side of the printing apparatus 2 with the opened roll paper cover 50.

At the time of attaching the conveyance-reference side flange unit 123 to the printing apparatus 2, the conveyance-reference side flange sliding shaft portion 122 (FIG. 7) is engaged to the conveyance-reference side flange bearing 71. In this process, the flange gear 125 (FIG. 7) is engaged with a driving gear 72 (FIG. 9) provided on the main body side of the printing apparatus 2. This driving gear 72 is rotated and driven by the roll paper motor 55 (FIG. 3) provided on the main body side of the printing apparatus 2. Thus, the conveyance-reference side flange unit 123 can rotate in forward direction and reverse direction with the roll paper unit 201 and the non-conveyance-reference side flange unit 124, whereby a feeding operation by the roll paper unit 201 is performed.

Figure 10A:
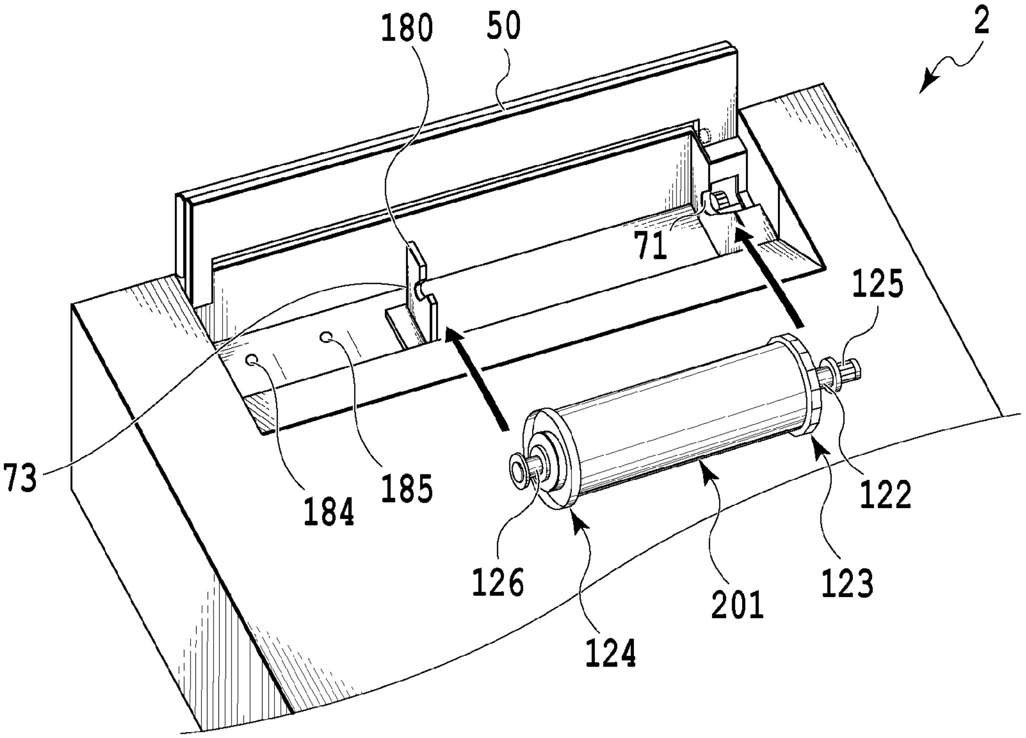
FIGS. 10A and 10B are perspective views describing mounting of the roll paper unit with the smallest roll paper width according to one embodiment of the present disclosure.
Figure 10B:
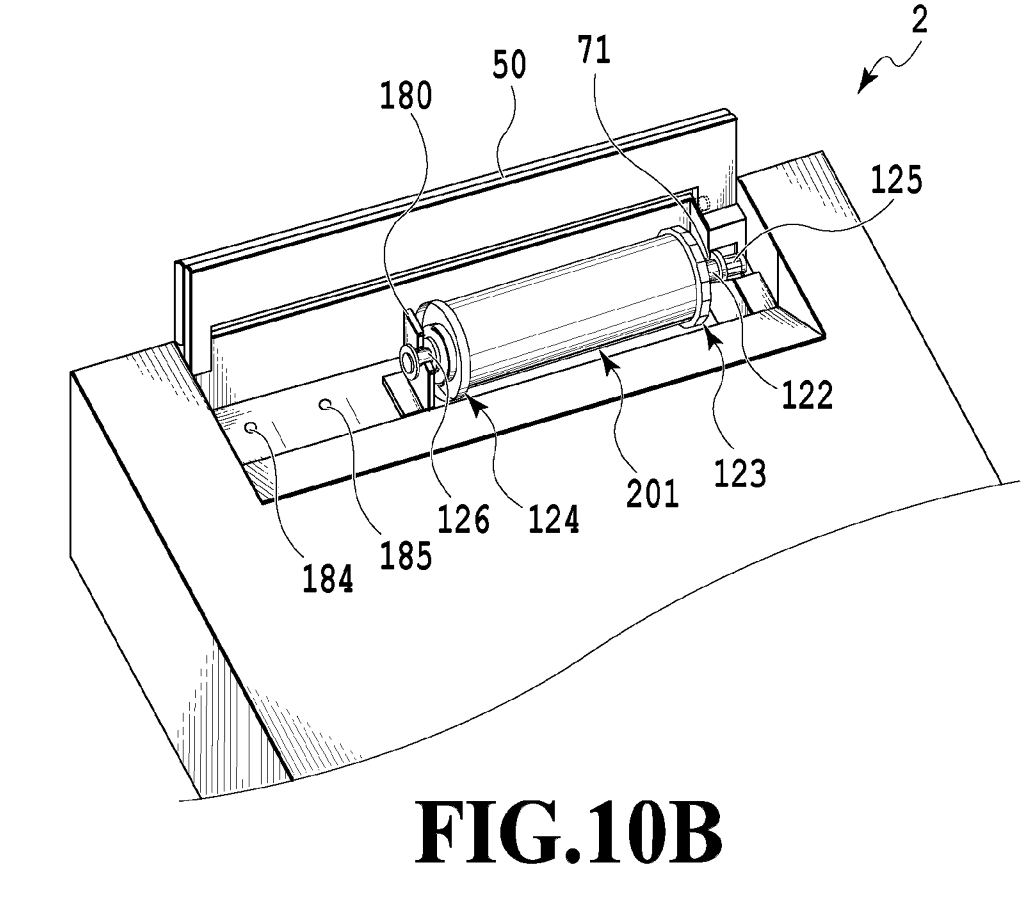

FIGS. 10A and 10B are perspective views describing mounting of the roll paper unit with the smallest roll paper width. FIG. 10A illustrates a state before the roll paper unit 201 is mounted on the printing apparatus 2, and FIG. 10B illustrates a state after the roll paper unit 201 is mounted on the printing apparatus 2. As illustrated in FIG. 10A, as with the mounting in a case where the roll paper unit 201 has a great roll paper width, the conveyance-reference side flange sliding shaft portion 122 is engaged to the conveyance-reference side flange bearing 71, and the non-conveyance-reference side flange sliding shaft portion 126 is engaged to the non-conveyance-reference side flange bearing 73. Accordingly, ease of mounting the roll paper unit 201 on the printing apparatus is similar to the case where the roll paper width is wide. As illustrated in FIG. 10B, even after the roll paper unit 201 is mounted on the printing apparatus 2, the conveyance-reference side flange sliding shaft portion 122 and the conveyance-reference side flange bearing 71 can be investigated visually. Also, the non-conveyance-reference side flange sliding shaft portion 126 and the non-conveyance-reference side flange bearing 73 can be investigated visually similarly to the case of mounting of the roll paper unit 201 with a wide paper width, and mounting of the roll paper unit 201 on the printing apparatus is facilitated.

[Action of Fitting Members in Flange Unit]

Figure 11A:
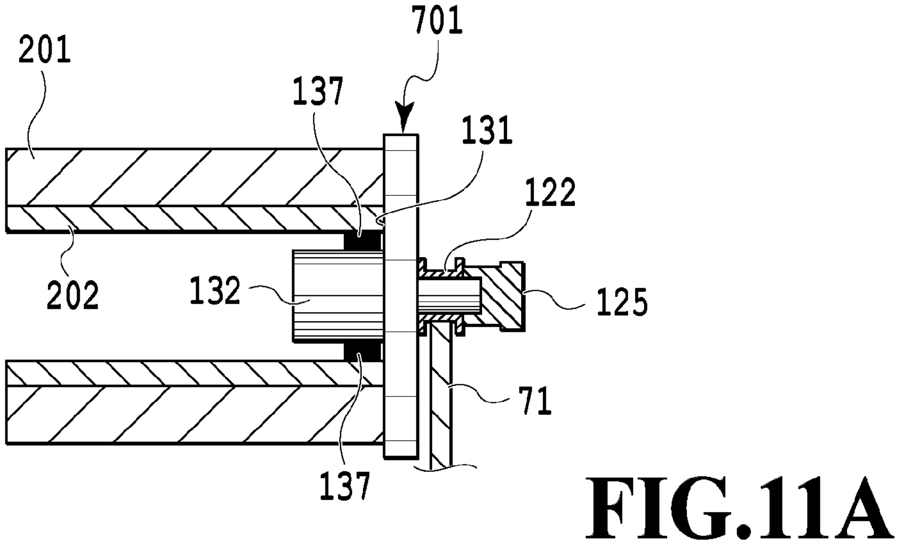
FIGS. 11A to 11C are diagrams describing action of the fitting members according to a comparative example.
Figure 11B:
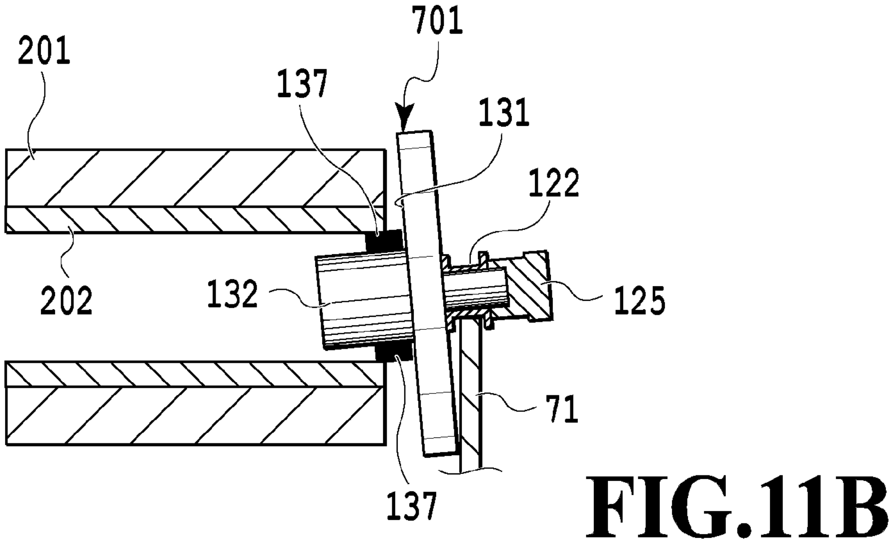
Figure 11C:
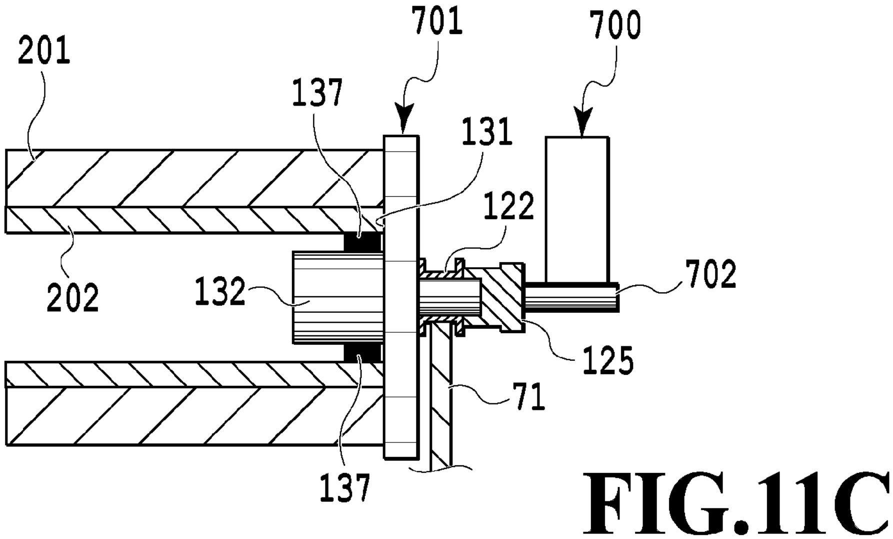
Figure 12:
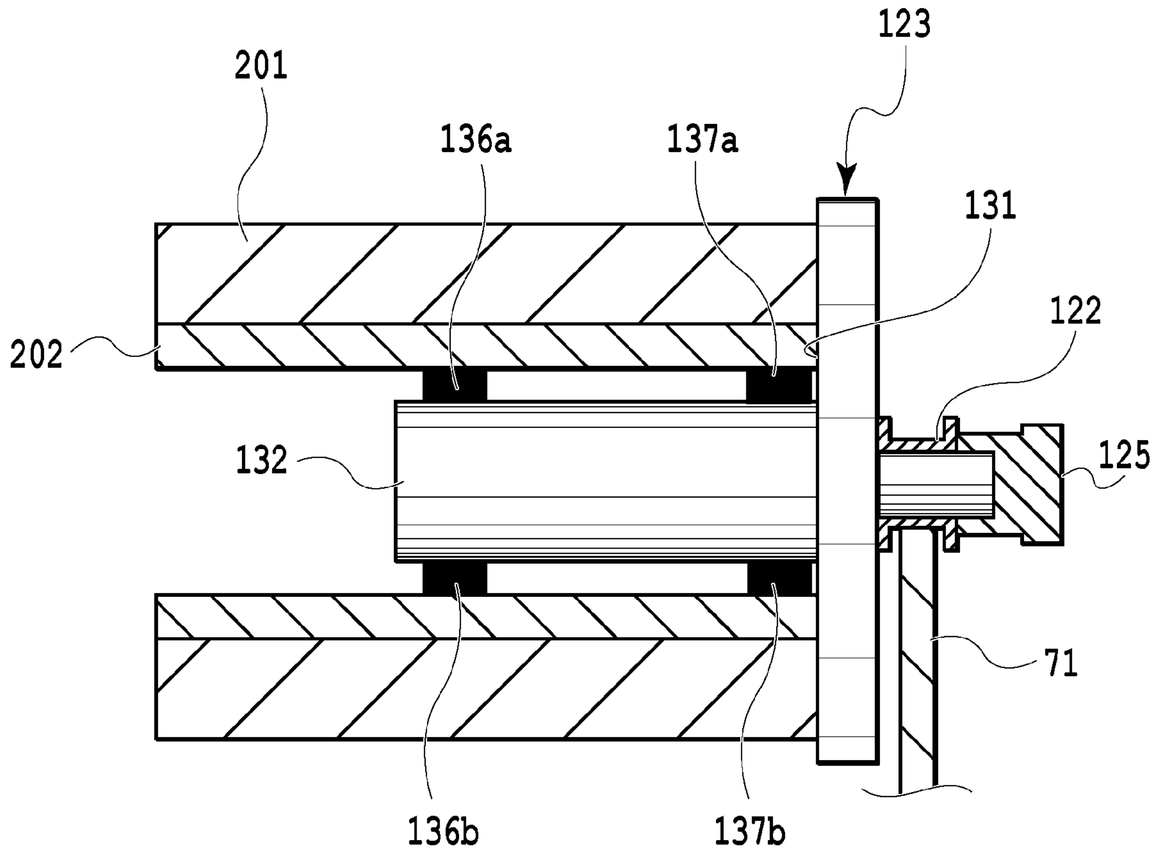
FIG. 12 is a diagram describing action of the fitting members according to one embodiment of the present disclosure.

The fitting members according to one embodiment of the present disclosure suppress each flange unit from tilting due to the weight of the roll paper portion. FIGS. 11A to 11C are diagrams describing action of the fitting members according to a comparative example, and FIG. 12 is a diagram describing action of the fitting members according to one embodiment of the present disclosure. Any of FIGS. 11A to 11C and 12 illustrate a state where the roll paper unit 201 formed by attaching the flange unit to the roll paper portion is mounted on the printing apparatus 2.

As illustrated in FIG. 11A, a flange unit 701 according to the comparative example includes the pair of the fitting members 137 on the flange core portion 132. The conveyance-reference side flange sliding shaft portion 122 of the flange unit 701 is slidably supported by the conveyance-reference side flange bearing 71 on the device main body side. In this case, the entirety of the flange unit 701 may tilt as illustrated in FIG. 11B depending on the weight of the roll paper unit 201. If the roll paper is fed from the roll paper unit 201 in such a state, inconvenience occurs such as displacement of an end portion position of the fed roll paper. To deal with this, as illustrated in FIG. 11C, there may be considered a configuration in which a shaft portion 702 extending from the flange unit 701 is provided, and also a member 700 that applies acting force in the opposite direction of the tilting direction to the shaft portion 702 is provided on the printing apparatus 2 side. However, in a case of this configuration, there are needed a mechanism that retracts the member 700 from the extending shaft portion 702 of the flange unit at the time of attaching the flange unit, a mechanism that moves the member 700 to a pressing position after the flange unit is attached, and the like. For this reason, there is inconvenience that the configuration of the main body device side is complicated, and the cost is increased.

To deal with this, in one embodiment the present disclosure, fitting members 137*a* and 137*b* (second contact members) and fitting members 136*a* and 136*b* (first contact members) apart from each other by a predetermined distance are provided to the conveyance-reference side flange core portion 132 as illustrated in FIG. 12. Thus, each of the fitting members 137*a* and 137*b* and the fitting members 136*a* and 136*b* is put in contact with the core pipe 202 of the roll paper unit 201 with no clearance. Additionally, the distance between the fitting members 137*a*, 137*b* and the fitting members 136*a*, 136*b* causes the moment against the moment causing the flange unit to tilt, and thus the tilting can be suppressed.

Note that, the fitting members 136 and the fitting members 137 may be provided to be distributed over the entire circumference of the inner wall surrounding the hollow portion of the core pipe 202. However, in this configuration, the cost is increased, and the force required to insert the conveyance-reference side flange unit 123 into the core pipe 202 of the roll paper portion is increased. For this reason, in the present embodiment, the fitting portions are not provided over the entire circumference, but instead the fitting members 136*a* and 136*b* are provided at two portions at an interval of 180 degrees in the circumferential direction. Likewise, the fitting members 137*a* and 137*b* are provided at two portions at an interval of 180 degrees in the circumferential direction. Here, each of the fitting members 136*a* and 136*b* has the two interference portions 153 in the shape of wings, and each of the fitting members 137*a* and 137*b* has the two interference portions interference portions 157 in the shape of wings. Accordingly, the four interference portions 153 and the four interference portions 157 in total are put in contact with the inner wall surrounding the hollow portion of the core pipe 202. Accordingly, regarding the conveyance-reference side flange 123, the total number of the interference portions (the interference portions 153 and the interference portions 157) put in contact with the inner wall surrounding the hollow portion of the core pipe 202 is eight.

As above, the situation described above with reference to FIGS. 11A to 11C and 12 is similarly applied to the flange unit on the non-conveyance-reference side. That is, regarding the non-conveyance-reference side flange 124, each of the fitting members 138*a* and 138*b* includes the two interference portions 153 in the shape of wings, and each of the fitting members 139*a* and 139*b* includes the two interference portions 157 in the shape of wings. Accordingly, regarding the non-conveyance-reference side flange 124, the total number of the interference portions (the interference portions 153 and the interference portions 157) put in contact with the inner wall surrounding the hollow portion of the core pipe 202 is eight.

Figure 13:
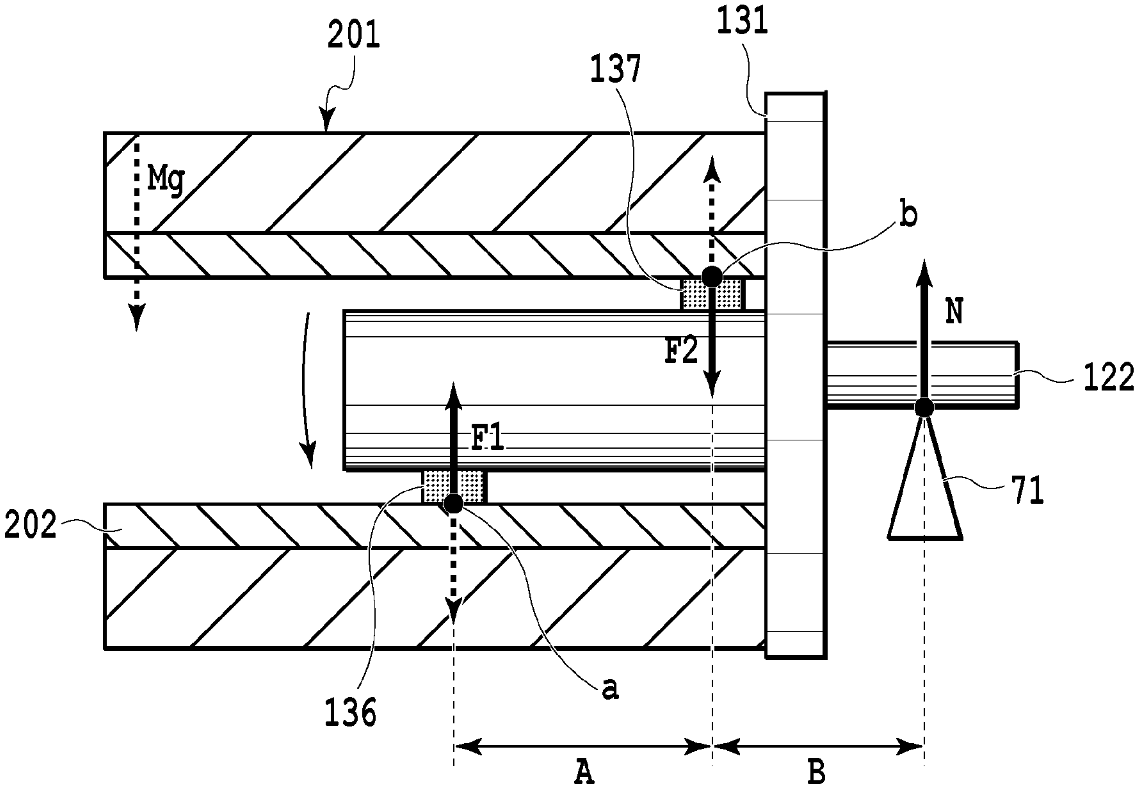
FIG. 13 is a diagram describing action of the fitting members according to one embodiment of the present disclosure with parameters such as a distance between the fitting members.

FIG. 13 is a diagram describing action of the fitting members according to one embodiment of the present disclosure with parameters such as a distance between the fitting members. In considering the tilting of the flange unit due to the weight of the roll paper, the force illustrated in FIG. 13 acts on each element of the roll paper unit 201. In other words, Mg is the weight of a combination of the core pipe 202 and the rolled up roll paper (the weight of the roll paper portion). F1 is reaction force that acts on each fitting member 136 (a point a) from the inner wall surrounding the hollow portion of the core pipe 202, F2 is reaction force that acts on each fitting member 137 (a point b) from the inner wall surrounding the hollow portion of the core pipe 202, and N is reaction force that acts on the flange sliding shaft portion 122 from the flange bearing 71. Note that, the weight Mg of the roll paper portion is different in accordance with the width of the roll paper used in the printing apparatus and is different also in accordance with the length of the roll paper rolled up around the core pipe 202. The weight Mg of the roll paper portion indicates the maximum value in a case where the roll paper with the maximum width is unused. In the present consideration, the weight Mg of the roll paper portion in this case is used. This is for considering a state where the tilt of the flange unit is the greatest. The point of action of force such as the points a and b is the center of a figure of a contact region (point, line, or surface) that is formed in a case where the fitting member and the sliding axis are put in contact with the core pipe and the bearing. In FIG. 13, A is a distance between the fitting member 136 (the point a) and the fitting member 137 (the point b), and B is a distance between the fitting member 137 (the point b) and the flange bearing 71 (the point of action). Here, those distances A and B are distances along the insertion direction in a case where the flange core portion 132 is inserted into the core pipe 202 of the roll paper portion. Note that, as a matter of course, the following descriptions are given with a calculation result taking into consideration also the flange unit on the non-conveyance-reference side.

The drags F1, F2, and N are obtained as functions of the weight Mg and the distances A and B using the relationship of the forces illustrated in FIG. 13, that is, based on a combination of a force balance of the roll paper portion in the weight direction, a force balance of the flange units on the two sides in the weight direction, and a moment balance at each of the flange units on the two sides. Accordingly, the elastic deformation amount due to the above-described reaction force F1 and F2 at the fitting member 136 (the point a) and the fitting member 137 (the point b) can be obtained, and subsequently, based on this elastic deformation amount, the tilt moduli of the fitting member 136 (the point a) and the fitting member 137 (the point b) with respect to the distance A can be obtained. At last, based on the obtained drags and tilt moduli described above, the tilt modulus of the flange unit on each of the two sides can be obtained.

According to the tilt modulus, it is desirable for the distance A between the first fitting member 136 and the second fitting member 137 to be equal to or greater than the distance B between the second fitting member 137 and the flange bearing 71 (the distance A is equal to or greater than the distance B). This is because the above-described tilt modulus has a characteristic to be smaller in inverse proportion to a distance ratio A/B squared. In other words, regarding this characteristic, it is confirmed in the printing apparatus of the present embodiment that the tilting of the flange unit is effectively suppressed as long as A/B is one or greater, experimentally. On the other hand, for example, the upper limit of A/B can be determined in terms of ease of handling the flange member taking into consideration the lengths of the flange core portions 132 and 134 on which the fitting members are disposed.

Note that, in terms of suppressing the tilting of the flange unit, the form of the fitting members is not limited to the above-described leaf spring form. The fitting members may be any elastic body as long as that the elastic body is disposed on the flange core portion 132, 134 at a predetermined distance in the length direction of the flange core portion 132, 134 and is put in contact with the roll paper core pipe 202 with appropriate elasticity while the flange unit is attached thereto. The fitting members may be a rubber member, for example.

In the above-described example, the first and second fitting members 136 and 137 are disposed to be arrayed on the same straight line along the longitudinal direction of the flange core portion 132, 134. In other words, the first and second fitting members 136 and 137 are disposed at the same position in the circumferential direction of the flange core portion 132, 134. However, it is not limited to this form. As long as the first fitting member 136 and the second fitting member 137 are provided away from each other at a predetermined distance along the longitudinal direction as described above, the first fitting member 136 and the second fitting member 137 may be disposed at different positions in the circumferential direction of the flange core portion.

Additionally, the number of the positions at which such elastic bodies are disposed in the circumferential direction of the flange core portion (positions at which the elastic bodies are put in contact with the inner wall surrounding the hollow portion of the core pipe) is two for one fitting member and is four in total for the two fitting members in the above-described embodiment; however, it is not limited thereto. Preferably, the positions at which such elastic bodies are disposed in the circumferential direction of the flange core portion are at least three positions. It is favorable that the three positions are arranged at intervals of 120 degrees. In other words, it is favorable that such elastic bodies are arranged at positions at three equal intervals in the circumferential direction of the flange core portion, and the elastic bodies are put in contact with the inner wall surrounding the hollow portion of the core portion at those positions. Thus, it is possible to align the centers of the flange unit and the hollow portion.

Embodiment 2

FIG. 14 is a perspective view illustrating the flange unit 123 on the conveyance-reference side according to an embodiment 2 of the present disclosure. The present embodiment is different from the above-described embodiment in that the fitting members 136 and 137 on the flange core portion 132 are operated by a cam member 160 that is provided inside the flange core portion 132 to form a mechanism for operating the fitting members 136 and 137. In other words, the cam member 160 pivots between a pressing position in which the fitting members 136 and 137 press the core pipe 202 of the roll paper and a retraction position in which the fitting members 136 and 137 is not put in contact with the core pipe 202 of the roll paper. In this regard, below the fitting members 136, 137, an opening is formed in a portion of the flange core portion 132. Note that, as with the above-described embodiment, since the flange unit 124 on the non-conveyance-reference side has a similar structure, only the flange unit 123 on the conveyance-reference side is described in the descriptions below. It is obvious from the following descriptions that it is possible also in the present embodiment to suppress the tilting of the flange units 123, 124 as with the above-described embodiment.

Figure 15:
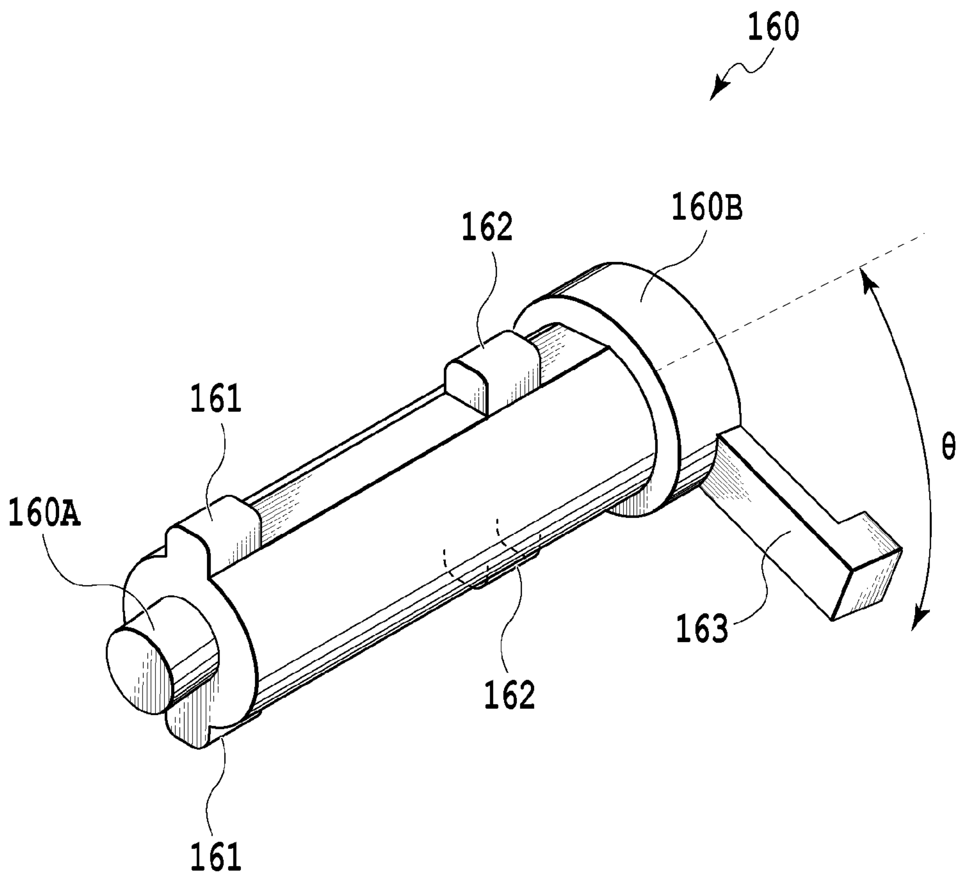
FIG. 15 is a perspective view illustrating details of a cam member 160 illustrated in FIG. 14.

As illustrated in FIG. 14, inside of the flange core portion 132 is hollow, and a cam member 160 is provided in the hollow so as to be pivotable about the longitudinal direction axis thereof. FIG. 15 illustrates the cam member 160. As illustrated in FIG. 15, the cam member 160 includes two pressing portions 161 and two pressing portions 162. Those pressing portions 161 and 162 correspond to the two fitting members 136 and 137 provided to the flange core portion 132, respectively, and are put in contact with and press the flat surface portions 152 and 156 of the fitting members 136 and 137 in accordance with the pivoting of the cam member 160. Additionally, the cam member 160 includes sliding shaft portions 160A and 160B in the form of a column at two ends thereof, respectively, and those sliding shaft portions 160A and 160B are slidably held by corresponding portions of the flange unit 123 as described later in details with reference to FIG. 16 and the like. Moreover, a lever portion 163 is provided on the circumference of the sliding shaft portion 160B at one end. The user can operate the lever portion 163 so as to move the pressing portions 161 and 162 by pivoting the cam member 160 between the position at which the flat surface portions 152 and 156 of the fitting members 136 and 137 are pressed (the pressing position) and the position at which no pressing is performed (the retraction position). A pivoting range of the lever portion 163 for this movement between the pressing position and the retraction position is indicated by θ in FIG. 15, and the pivoting is restricted within this range by the engagement relationship between the lever portion 163 the flange unit 123 as described with reference to FIG. 16 and the like.

In the present embodiment, by pivoting, the cam member 160 can reciprocate between the pressing position in which the cam member 160 presses the fitting members 136 and 137 and the retraction position in which the cam member 160 retracts from the pressing position. Attaching the flange unit 123 to the roll paper portion while the cam member 160 is moved to the retraction position makes it possible to reduce the resistance between the fitting members 136 and 137 and the inner wall surrounding the hollow portion of the core pipe during the attaching and to improve the operation performance. Here, the retraction position is a position in which the fitting members 136 and 137 are not put in contact with the inner wall surrounding the hollow portion of the core pipe or at which the fitting members 136 and 137 are put in contact with the inner wall but are easily deformed due to the contact (by relatively small force).

In other words, the inner diameter of the hollow portion of the core pipe 202 of the roll paper unit may have a variation depending on the type and the production lot of the roll paper. Here, if the fitting members 136 and 137 are formed in accordance with the dimension of the hollow portion with a small inner diameter in the embodiment 1, the fitting members 136 and 137 cannot interfere and cannot be put in contact with the hollow portion at the time of inserting the fitting members 136 and 137 into the hollow portion with a relatively great inner diameter. For this reason, the roll paper portion cannot be held appropriately, and additionally the tilting of the flange unit 123 described above in the embodiment 1 cannot be suppressed. Therefore, in the embodiment 1, the dimension and the like of the fitting members 136 and 137 are determined in accordance with the dimension of the hollow portion with a great inner diameter. However, in this case, the fitting members 136 and 137 are deformed greatly to be inserted in a case of attaching those fitting members to the hollow portion with a relatively small inner diameter, and the force required for the attachment is increased.

To deal with this, in the present embodiment, the fitting members 136 and 137 are moved to the retraction position at the time of attaching the flange unit 123 to the roll paper portion as described above. On the other hand, in a case where the flange unit 123 is attached to the roll paper portion and thereafter the roll paper unit 201 is formed to be used, the fitting members 136 and 137 are moved to the pressing position in which the fitting members 136 and 137 are put in contact with and press the hollow portion of the roll paper.

Referring back to FIG. 14. In the structure of the flange unit 123, the fitting members 136 and 137 reciprocate between the pressing position and the retraction position by the above-described cam member 160. For this configuration, the flange core portion 132 below the fitting members 136 and 137 is hollow. Thus, the flat surface portions 152 and 156 of the fitting members 136 and 137 and the pressing portions 161 and 162 of the cam member 160 can be put in contact with each other.

The first fitting member 136 is screwed on the conveyance-reference side flange unit 123 by the fixing portion 150, and the second fitting member 137 is screwed on the conveyance-reference side flange unit 123 by the fixing portion 154.

Figure 16A:
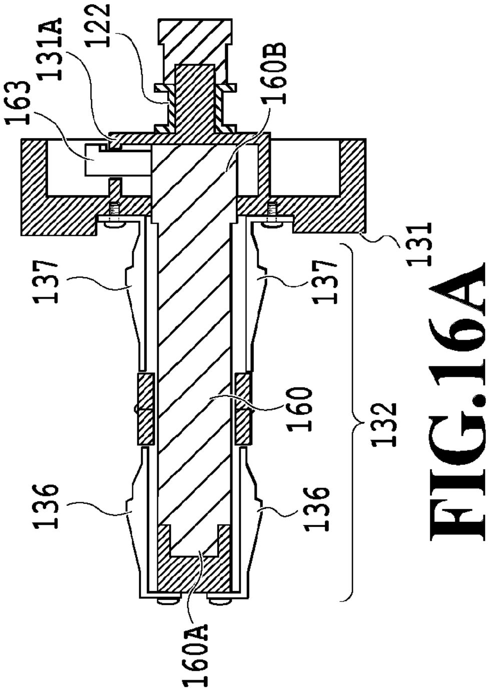
FIGS. 16A to 16D are diagrams describing an engagement relationship between the cam member and the flange unit and pressing and retraction of the fitting members by pivoting of the cam member according to the other embodiment of the present disclosure.
Figure 16B:
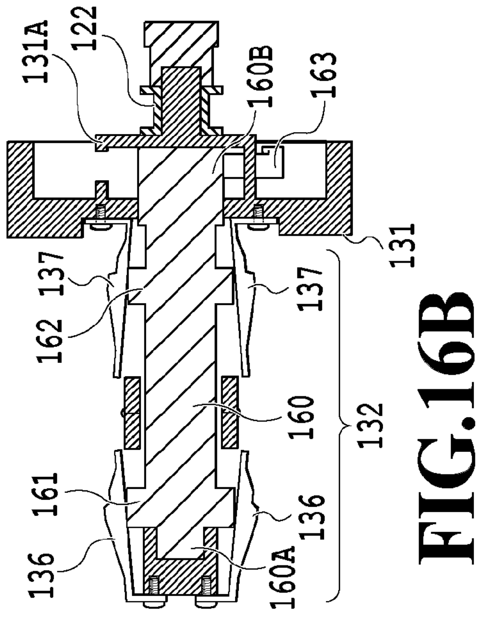

As illustrated in details in FIGS. 16A and 16B, the lever portion 163 of the cam member 160 is positioned on the back surface side of the flange 131, in other words, a side on which the conveyance-reference side flange sliding shaft portion 122 is disposed. The flange 131 has a recess portion formed of a groove extending in the circumferential direction on the back surface side, and the lever portion 163 can be operated in the recess portion.

Figure 16C:
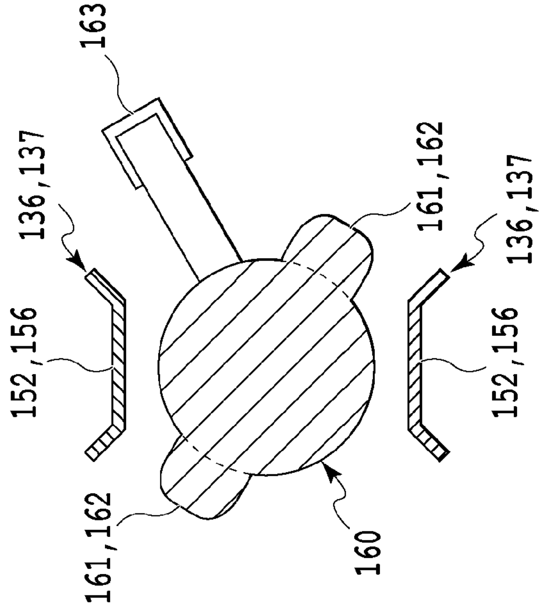
Figure 16D:
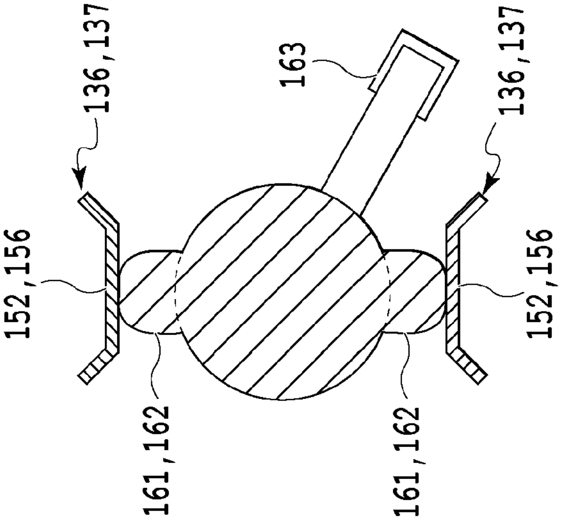

FIGS. 16A to 16D are diagrams describing the engagement relationship between the cam member 160 and the flange unit 123 and the pressing and the retraction with respect to the fitting members 136 and 137 by the pivoting of the cam member 160. Among the drawings, FIGS. 16A and 16B are cross-sectional views in which the conveyance-reference side flange unit 123 is viewed from a radial direction of the roll paper, and FIGS. 16C and 16D are cross-sectional views in which the conveyance-reference side flange unit 123 is viewed from a rotation axis direction of the roll paper unit 201. FIGS. 16A and 16C illustrate orientations of the fitting members 136 and 137 and the cam member 160 in a position 1, and FIGS. 16B and 16D illustrate orientations of the fitting members 136 and 137 and the cam member 160 in a position 2.

As illustrated in FIGS. 16A and 16B, the sliding shaft portion 160A at one end of the cam member 160 is slidably engaged with a leading end portion of the flange core portion 132, and the sliding shaft portion 160B at the other end is slidably engaged with a groove bottom portion on back surface side of the flange 131. Thus, the cam member 160 is pivotably held by the flange unit 123, and each pivot position is maintained. The lever portion 163 of the cam member 160 is provided from the extending portion of the sliding shaft portion 160B so as to extend perpendicularly to the extending portion. The lever portion 163 extends to the outside of a protrusion portion 131A forming a part of the flange 131 through a slot (groove) formed on the protrusion portion 131A, and thus the user can operate the lever portion 163. This slot is formed on a part of the circumferential direction of the protrusion portion 131A, and thus the pivoting range of the lever portion 163 is restricted to the angle range θ illustrated in FIG. 15.

As illustrated in FIGS. 16A and 16C, the position 1 is the retraction position in which the pressing portions 161 and the pressing portions 162 of the cam member 160 do not press the flat surface portion 152 of the first fitting member 136 and the flat surface portion 156 of the second fitting member 137, respectively. On the other hand, as illustrated in FIGS. 16B and 16D, the position 2 is the pressing position in which the pressing portions 161 and the pressing portions 162 press the flat surface portion 152 of the first fitting member 136 and the flat surface portion 156 of the second fitting member 137, respectively. It is possible to switch between the position 1 and the position 2 by operating the lever portion 163 in the direction to pivot with respect to the longitudinal direction axis line of the roll paper unit 201.

Figure 17A:
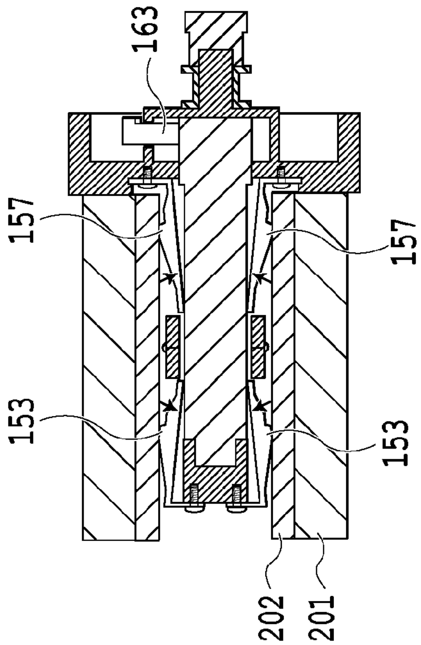
FIGS. 17A to 17D are diagrams describing a configuration related to elastic deformation of the fitting members according to the other embodiment of the present disclosure.
Figure 17B:
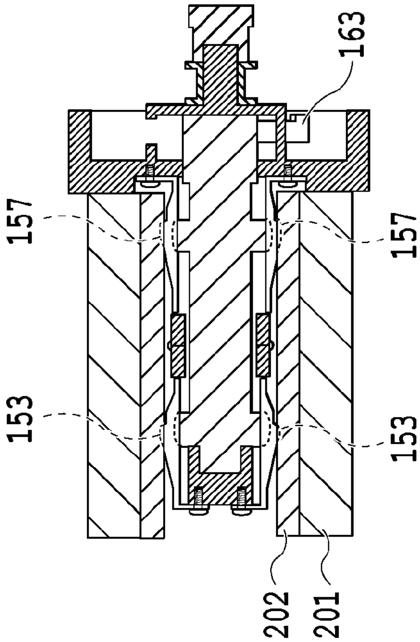
Figure 17C:
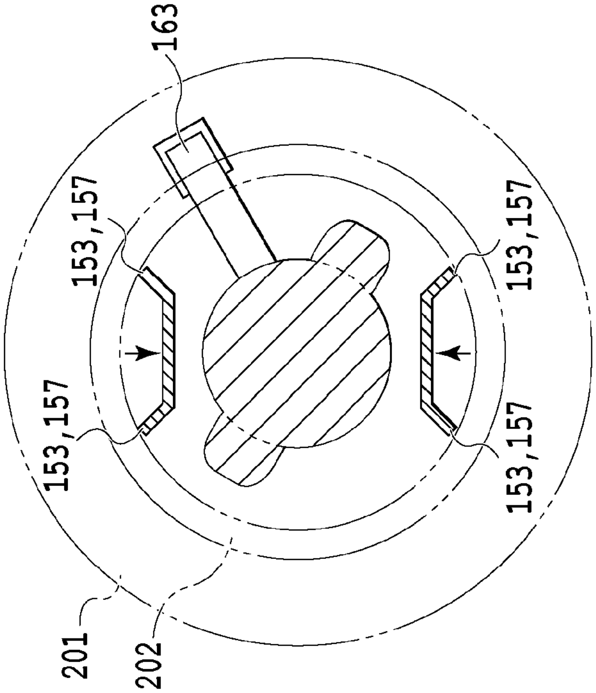
Figure 17D:
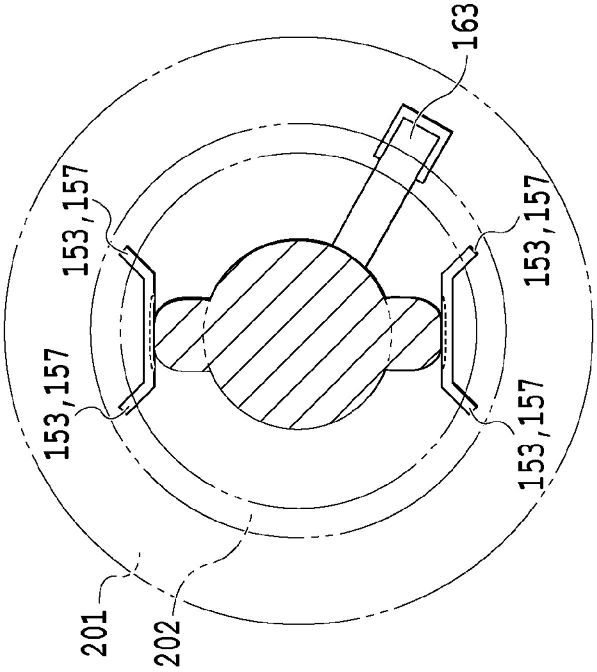

FIGS. 17A to 17D are diagrams describing a configuration related to the deformation of the fitting members. Among the drawings, FIGS. 17A and 17B illustrate cross-sectional views along a radial direction of the flange unit, and FIGS. 17C and 17D illustrate cross-sectional views along a rotation axis direction of the flange unit. As described above, the cam member 160 is switched to the position 1 in a case of attaching the flange unit 123 to the roll paper portion. In this position 1, the interference portion 153 of the first fitting member 136 and the interference portion 157 of the second fitting member 137 may be put in contact with the inner wall surrounding the hollow portion of the core pipe 202 of the roll paper portion. With this contact, the first fitting member 136 and the second fitting member 137 are deformed in a direction away from the core pipe 202. In this case, as illustrated in FIG. 6, the interference portions 153 and the fixing portion 150 are apart from each other by a predetermined distance, the interference portions 157 and the fixing portion 154 are apart from each other by a predetermined distance. The width of the constricted portion 151 and the constricted portion 155 is set small. Thus, it is possible to reduce the force required to deform the first fitting member 136 and the second fitting member 137. Thus, it is possible to reduce the frictional force between the interference portions 153, 157 and the inner wall surrounding the hollow portion of the roll paper core pipe 202, and it is possible to reduce the attachment load. As a result, the operation performance at the time of attaching the flange unit 123 to the roll paper portion is improved. After the flange unit 123 is inserted into the roll paper portion, the cam member 160 is switched to the position 2 as illustrated in FIGS. 17B and 17D. As described above, in the position 2, the pressing portions 161 and the pressing portions 162 press the flat surface portion 152 of the first fitting member 136 and the flat surface portion 156 of the second fitting member 137, respectively. As a result, the interference portions 153 and the interference portions 157 are put in contact with the core pipe 202 of the roll paper, and the flange unit 123 is fixed into the core pipe 202. The first fitting member 136 and the second fitting member 137 are elastic bodies. Accordingly, with the elastic deformation of those fitting members 136 and 137, it is possible to suppress the displacement of the roll paper portion in which the flange unit 123 is fixed into the core pipe 202 of the roll paper portion by absorbing the variation of the inner diameter of the core pipe 202 of the roll paper.

Note that, the cam member 160 includes the pressing portions 161 and 162 corresponding to the first and second fitting members 136 and 137 in the above-described embodiment; however, only the pressing portions 161 may be included corresponding to only the first fitting members 136 at the position far from the flange 131. According to this form, a configuration in which the first fitting members 136 that are put in contact with the core pipe 202 first at the time of inserting the flange core portion 132 into the core pipe 202 of the roll paper can be retracted is obtained, and it is possible to secure the operation performance of attaching the flange unit also in this form.

Additionally, the positions 1 and 2 of the fitting members 136 and 137 are switched by operating the lever portion of the cam member in the above-described embodiment 2; however, it is not limited to this form. For example, the force in a longitudinal vertical axis direction of the flange core portion 132, 134 may act through a spring. In this case, a member that develops force in the axis direction by the cam action into a direction crossing a longitudinal vertical axis is used. The fitting members are then pressed by the member.

Embodiment 3

Figure 18A:
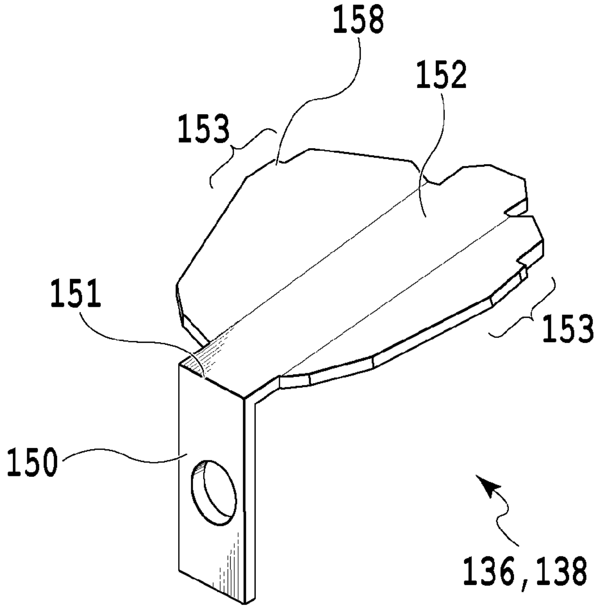
FIGS. 18A and 18B are diagrams describing the shape and action of the interference portions of the fitting member according to another additional embodiment of the present disclosure.
Figure 18B:
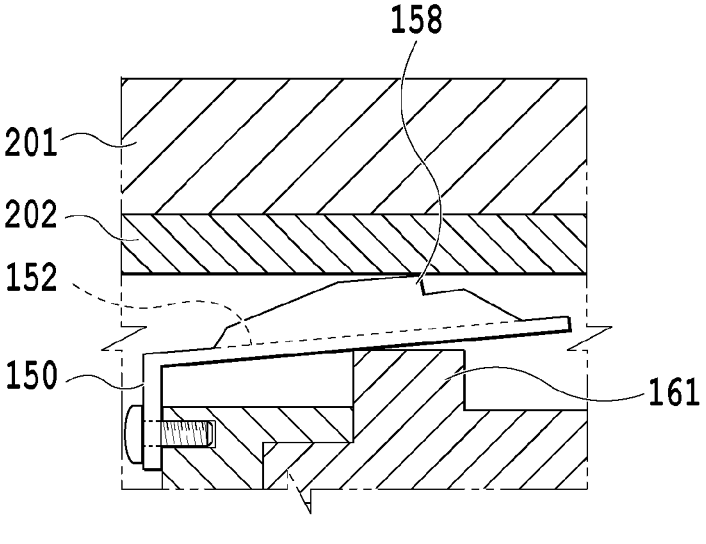

An embodiment 3 of the present disclosure relates to the interference portions 153 and 157 of the first fitting member 136 and the second fitting member 137. FIGS. 18A and 18B are diagrams describing the shape and action of the interference portions of the fitting member. The fitting members 136 and 137 of the conveyance-reference side flange unit 123 are described below, and descriptions of the fitting members 136 and 137 of the non-conveyance-reference side flange unit 124 are omitted since they have similar configurations.

As illustrated in FIG. 18A, a corner portion 158 is provided to each interference portion 153 of the first fitting member 136. As illustrated in FIG. 18B, in the position 2, the flat surface portion 152 of the first fitting member 136 is pressed by the pressing portion 161 of the cam member 160, and the interference portion 153 is put in contact with the inner wall surrounding the hollow portion of the core pipe 202 of the roll paper portion. Thus, in a case where any force acts in a direction in which the roll paper portion is drawn from the conveyance-reference side flange unit 123 (a direction in which the roll paper portion is moved from right to left of FIG. 18B with respect to the conveyance-reference side flange unit 123 in FIG. 18B), the corner portions 158 dig into the wall of the core pipe 202. Thus, it is possible to suppress the movement (displacement) of the roll paper portion with respect to the conveyance-reference side flange unit 123. Note that, in a case of the non-conveyance-reference side, the above-described drawing direction is changed to the opposite direction.

Figure 19:
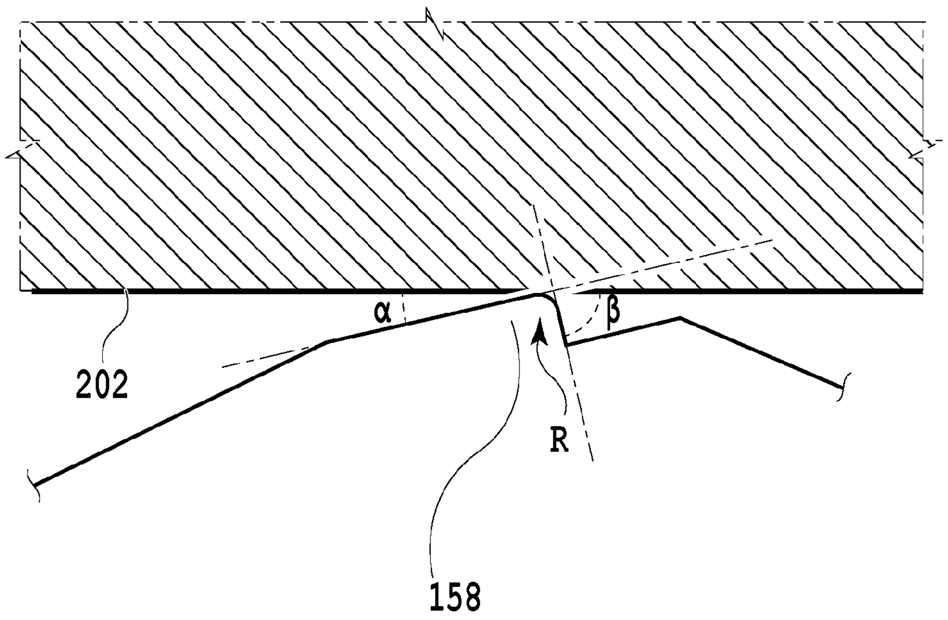
FIG. 19 is a diagram illustrating details of a corner portion in the interference portion illustrated in FIG. 18.

FIG. 19 is a diagram illustrating details of the corner portion. As illustrated in FIG. 19, in a case where an angle formed by one of two crossing straight lines forming the corner portion 158 and the longitudinal direction axis of the core pipe 202 is a, and an angle formed by the other of the two crossing straight lines is (3, it is favorable that $\alpha<\beta$. Here, as illustrated in FIGS. 18 and 19, $\alpha$ is an angle formed by the straight line farther from the flange 131 out of the two straight lines forming the corner portion 158, and $\beta$ is an angle formed by the straight line closer from the flange 131 out of the two straight lines. In other words, $\alpha$ is an angle formed by the straight line farther from an end portion of the core portion on a rear side in the insertion direction into the core pipe, and $\beta$ is an angle formed by the straight line closer therefrom. Since the two crossing straight lines have such an angle relationship, the corner portion 158 can have a directionality to be against the direction in which the roll paper portion is drawn from the flange core portion 132, and it is possible to suppress the movement (displacement) of the roll paper portion with respect to the conveyance-reference side flange unit 123 more successfully. An apex of the corner portion 158 has a substantially round shape, and a radius R of this rounded portion can be determined in accordance with a desired amount of the digging of the corner portion 158 into the wall of the core pipe 202.

According to the above embodiment, since the function of suppressing the displacement of the roll paper portion with respect to the conveyance-reference side flange unit 123 is added, it is possible to reduce the required pressing amount by the pressing portions 161 to the first fitting member 136. Consequently, it is possible to further reduce the operation force required to operate the lever portion 163 from the position 1 to the position 2.

Figure 20:
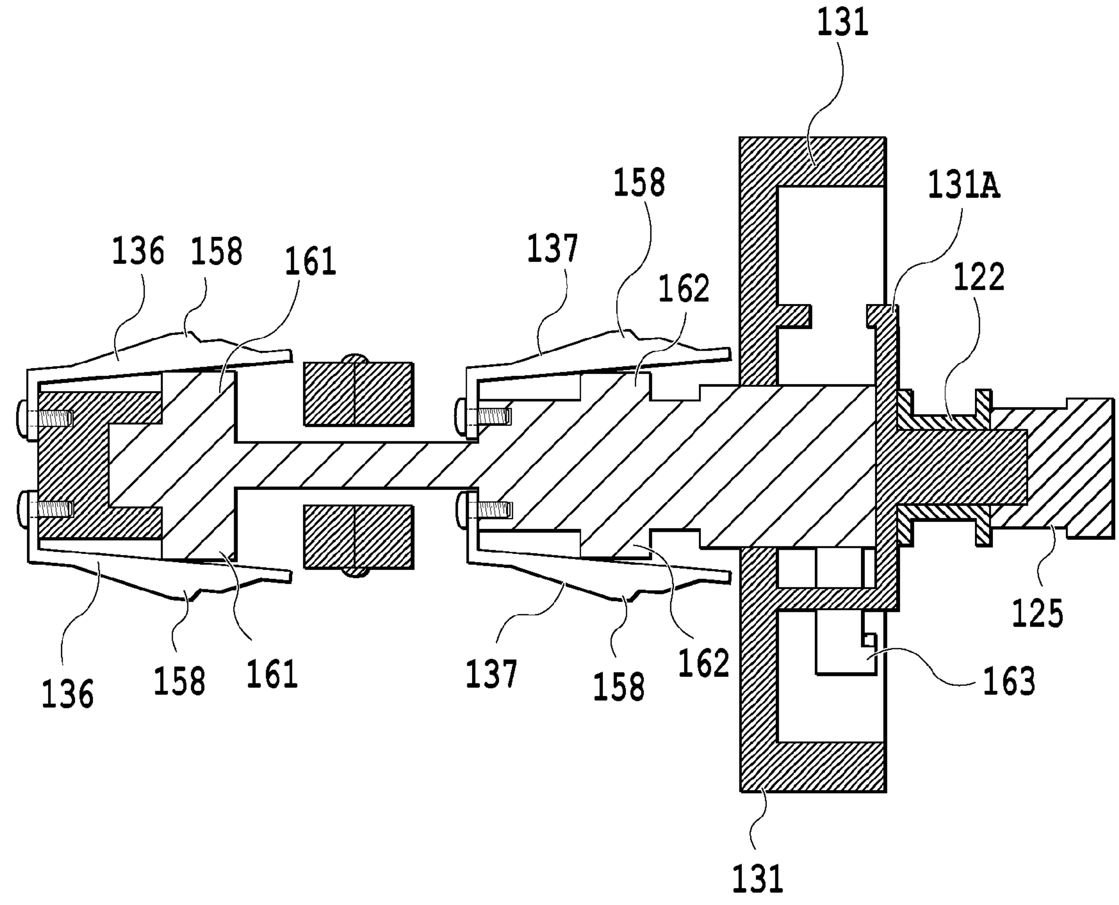
FIG. 20 is a cross-sectional view illustrating a structure of the flange unit according to the other additional embodiment of the present disclosure.

The shape of the corner portion 158 of the first fitting member 136 is described above; however, the second fitting member 137 may have a corner portion shape similar to that of the first fitting member 136 as illustrated in FIG. 20. Additionally, as illustrated in FIG. 20, the fixing portion 154 of the second fitting member 137 may have the same configuration as that of the fixing portion 150 of the first fitting member 136, and a form in which a portion close to the conveyance-reference side flange 131 is pressed by the second fitting member 137 as modified may be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-043643, filed Mar. 18, 2022, which is hereby incorporated by reference wherein in its entirety.

What is claimed is:

1. A printing apparatus that performs printing on a sheet drawn out from a roll in which the sheet is rolled up around a core pipe, comprising:

a roll holding unit configured to hold the roll;

a support unit configured to rotatably support the roll holding unit;

a flange provided to the roll holding unit and configured to restrict movement of the roll along a rotation axis;

a core portion provided to the roll holding unit so as to extend from the flange along the rotation axis of the roll holding unit and configured to be inserted into a hollow portion of the core pipe from an end portion of the core pipe;

a first contact member provided to the core portion and configured to be elastically deformed to a position where the first contact member presses a first portion of an inner wall surrounding the hollow portion of the core pipe; and a second contact member provided to the core portion at a position between the first contact member and the flange along the rotation axis and configured to be elastically deformed to a position where the second contact member presses a second portion of the inner wall surrounding the hollow portion of the core pipe.

2. The printing apparatus according to claim 1, comprising a shaft portion provided to the roll holding unit on an opposite side of the flange along the rotation axis with respect to the core portion and configured to be supported by a bearing portion of the support unit, wherein a distance between a first action point of the first contact member and a second action point of the second contact member along the rotation axis is the same as or longer than a distance between the second action point and a third action point of the shaft portion.

3. The printing apparatus according to claim 2, wherein the shaft portion extends from a surface on an opposite side of a surface of the flange.

4. The printing apparatus according to claim 1, wherein at least one of the first contact member and the second contact member is able to be put in contact with the inner wall surrounding the hollow portion of the core pipe at three or more positions in a circumferential direction of the core portion.

5. The printing apparatus according to claim 1, wherein the first contact member and the second contact member are disposed at positions common to each other in a circumferential direction of the core portion.

6. The printing apparatus according to claim 1, wherein the first contact member and the second contact member are disposed at positions different from each other in a circumferential direction of the core portion.

7. The printing apparatus according to claim 1, wherein at least either one of the first and second contact members is in a form of a leaf spring formed by bending a plate member along two bent portions and includes a flat surface portion and two wing-shaped portions continuously contact with the flat surface portion at a tilt through the two bent portions.

8. The printing apparatus according to claim 7, wherein at least either one of the two wing-shaped portions includes a corner portion that is put in contact with the inner wall surrounding the hollow portion of the core pipe.

9. The printing apparatus according to claim 8, wherein the corner portion of the wing-shaped portion has an angle formed by two crossing straight lines, and while the core portion is inserted in the core pipe, an angle formed by the inner wall of the core pipe and one of the two straight lines that is closer to an end portion of the core portion on a rear side in an insertion direction of the core portion into the core pipe is greater than an angle formed by the inner wall of the core pipe and the other one of the two straight lines.

10. The printing apparatus according to claim 1, wherein the roll holding unit includes an operation mechanism configured to allow for an operation of pressing the first contact member and the second contact member onto the inner wall surrounding the hollow portion of the core pipe and an operation of retracting the first contact member and the second contact member from the inner wall surrounding the hollow portion of the core pipe.

11. The printing apparatus according to claim 10, wherein the operation mechanism allows for the pressing operation by pressing the first contact member and the second contact member by a pressing portion of a cam member.

12. The printing apparatus according to claim 1, wherein the number of the roll holding unit included is two, and the two roll holding units are inserted into the hollow portion of the core pipe from two ends of the core pipe, respectively.

13. A roll holding device that holds a roll in which a sheet is rolled up around a core pipe, comprising:

a flange configured to restrict movement of the roll along a rotation axis;

a core portion extending from the flange along the rotation axis of the roll holding unit and configured to be inserted into a hollow portion of the core pipe from an end portion of the core pipe;

a first contact member provided to the core portion and configured to be elastically deformed to a position where the first contact member presses a first portion of an inner wall surrounding the hollow portion of the core pipe; and a second contact member provided to the core portion at a position between the first contact member and the flange along the rotation axis and configured to be elastically deformed to a position where the second contact member presses a second portion of the inner wall surrounding the hollow portion of the core pipe.

* * * * *